(12) United States Patent
He et al.

(10) Patent No.: US 12,021,791 B2
(45) Date of Patent: Jun. 25, 2024

(54) SCHEDULING FOR MULTIPLE PDSCH/PUSCH OPERATIONS

(71) Applicant: Apple Inc., Cupertino, CA (US)

(72) Inventors: Hong He, Cupertino, CA (US); Chunhai Yao, Beijing (CN); Chunxuan Ye, San Diego, CA (US); Dawei Zhang, Saratoga, CA (US); Haitong Sun, Irvine, CA (US); Huaning Niu, San Jose, CA (US); Oghenekome Oteri, San Diego, CA (US); Wei Zeng, San Diego, CA (US); Weidong Yang, San Diego, CA (US)

(73) Assignee: Apple Inc., Cupertino, CA (US)

(*) Notice: Subject to any disclaimer, the term of this patent is extended or adjusted under 35 U.S.C. 154(b) by 298 days.

(21) Appl. No.: 17/439,275

(22) PCT Filed: Aug. 6, 2021

(86) PCT No.: PCT/CN2021/111257
§ 371 (c)(1),
(2) Date: Sep. 14, 2021

(87) PCT Pub. No.: WO2023/010550
PCT Pub. Date: Feb. 9, 2023

(65) Prior Publication Data
US 2023/0275735 A1    Aug. 31, 2023

(51) Int. Cl.
*H04L 5/00* (2006.01)
*H04L 1/1812* (2023.01)

(52) U.S. Cl.
CPC .......... *H04L 5/0092* (2013.01); *H04L 1/1812* (2013.01)

(58) Field of Classification Search
CPC ............................ H04L 5/0092; H04L 1/1812
See application file for complete search history.

(56) References Cited

U.S. PATENT DOCUMENTS

| | | | |
|---|---|---|---|
| 2013/0188535 A1* | 7/2013 | Seo | H04L 1/1614 370/328 |
| 2015/0043394 A1* | 2/2015 | Lin | H04L 1/1893 370/280 |
| 2017/0048846 A1* | 2/2017 | Yang | H04L 1/1861 |

(Continued)

FOREIGN PATENT DOCUMENTS

| | | |
|---|---|---|
| CN | 110943805 A | 3/2020 |
| CN | 111742510 A | 10/2020 |

(Continued)

OTHER PUBLICATIONS

International Search Report and Written Opinion for PCT/CN2021/111257; 9 pages; dated Apr. 27, 2022.

(Continued)

*Primary Examiner* — Brenda H Pham
(74) *Attorney, Agent, or Firm* — Kowert, Hood, Munyon, Rankin & Goetzel, P.C.

(57) ABSTRACT

Apparatuses, systems, and methods for determination and scheduling for multiple PDSCH/PUSCH operations in wireless communication, e.g., in 5G NR systems and beyond, including methods for separate HARQ-ACK sub-codebook operation, for collision handling between PDSCH/PUSCH with TDD configurations, and for multi-PXSCH scheduling signaling.

20 Claims, 14 Drawing Sheets

(56) References Cited

U.S. PATENT DOCUMENTS

2018/0241510 A1\* 8/2018 Shen .................. H04L 1/18
2021/0050950 A1\* 2/2021 Zhou .................. H04W 76/14
2021/0226759 A1\* 7/2021 Takeda ............... H04L 5/0055

FOREIGN PATENT DOCUMENTS

CN 111903170 A 11/2020
CN 112753192 A 5/2021

OTHER PUBLICATIONS

Nokia et al. "On remaining details of HARQ procedure"; 3GPP TSG RAN WG1 Meeting 91 R1-1720480; Reno, USA; 9 pages; Dec. 1, 2017.

\* cited by examiner

FIG. 9

| CC1 | CC2 | CC3 | CC4 | CC5 | CC6 | CC7 | CC8 |
|-----|-----|-----|-----|-----|-----|-----|-----|
| 2   | 2   | 2   | 2   | 4   | 8   | 6   | 8   |

SCHEDULING FOR MULTIPLE PDSCH/PUSCH OPERATIONS

PRIORITY CLAIM INFORMATION

This application is a national stage application of International Application No. PCT/CN2021/111257, filed on Aug. 6, 2021, titled "Scheduling for Multiple PDSCH/PUSCH Operations", which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The invention relates to wireless communications, and more particularly to apparatuses, systems, and methods for determination and scheduling for multiple PDSCH/PUSCH operations in wireless communication, e.g., in 5G NR systems and beyond.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) is currently the technology of choice for the majority of wireless network operators worldwide, providing mobile broadband data and high-speed Internet access to their subscriber base. LTE was first proposed in 2004 and was first standardized in 2008. Since then, as usage of wireless communication systems has expanded exponentially, demand has risen for wireless network operators to support a higher capacity for a higher density of mobile broadband users. Thus, in 2015 study of a new radio access technology began and, in 2017, a first release of Fifth Generation New Radio (5G NR) was standardized.

5G-NR, also simply referred to as NR, provides, as compared to LTE, a higher capacity for a higher density of mobile broadband users, while also supporting device-to-device, ultra-reliable, and massive machine type communications with lower latency and/or lower battery consumption. Further, NR may allow for more flexible UE scheduling as compared to current LTE. Consequently, efforts are being made in ongoing developments of 5G-NR to take advantage of higher throughputs possible at higher frequencies.

SUMMARY

Embodiments relate to wireless communications, and more particularly to apparatuses, systems, and methods for determination and scheduling for multiple PDSCH/PUSCH operations in wireless communication, e.g., in 5G NR systems and beyond.

For example, embodiments include methods for separate HARQ-ACK sub-codebook operation, for collision handling between PDSCH/PUSCH with TDD configurations, and for multi-PXSCH scheduling signaling.

As an example, a UE may receive, from a serving cell, an indication of a threshold value, e.g., a maximum number of physical downlink shared channels (PDSCHs) in a multi-PDSCH schedule that can be scheduled by a downlink control indicator (DCI). The indication may be received via a system information block (SIB) 1 message, via a medium access control (MAC) control element (CE), e.g., by selecting a threshold value from a set of threshold values configured via radio resource control (RRC) signaling. Further, the indication may be received via the DCI, or via a group-specific DCI. Additionally, the UE may divide configured component carriers (CCs) into a first group and a second group based on the threshold value and a maximum number of addressable PDSCHs by the DCI for each CC. Further, the UE may determine a first hybrid automatic repeat request (HARQ) acknowledgement (ACK) sub-codebook and a second HARQ-ACK sub-codebook based on one or more criteria, e.g., based, at least in part, on dividing the configured CCs into the first group and the second group.

As another example, a HE may add to a first HARQ-ACK sub-codebook, HARQ-ACK bits for physical downlink shared Channels (PDSCHs) that are scheduled by a fallback DCI format 1_0. Additionally, the UE may add to a second HARQ-ACK sub-codebook, HARQ-ACK bits for PDSCHs that are scheduled by non-fallback DCI with an extended counter downlink assignment index (C-DAD field and an extended total DAI (T-DAI) field. The extended C-DAI field may have a size greater than two bits. Additionally, the extended T-DAI field may have a size greater than two bits.

As a further example, a UE may receive, from a serving cell, a DCI that schedules multiple PDSCHs/PUSCHs and determine a gap between consecutively scheduled PDSCHs/PUSCHs based on at least one K0/K2 value. The at least one K0/K2 value may be a K0/K2 value for a first PDSCH/PUSCH and determining the gap between consecutively scheduled PDSCHs/PUSCHs may be further based on an additional gap offset value between PDSCHs/PUSCHs per start and length indicator value. In some embodiments, the at least one K0/K2 value may include a K0/K2 value for each PDSCH/PUSCH per start and length indicator value.

As a yet further example, a UE may index valid physical uplink control channel (PUSCH) transmission occasions, e.g., within a multi-PUSCHs that are scheduled by a single DCI, and determine a starting resource block (RB) of a PUSCH transmission occasion based on an index of the PUSCH within the multi-PUSCH that is scheduled by the single DCI and a starting PRB and RB offset between two frequency hops that are provided by the single DCI.

The techniques described herein may be implemented in and/or used with a number of different types of devices, including but not limited to unmanned aerial vehicles (UAVs), unmanned aerial controllers (UACs), a UTM server, base stations, access points, cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIG. 9 illustrates an example of a table for determining a maximum number of addressable PDSCHs by a single DCI for a given CC index for different CCs, according to some embodiments.

Figure 1A:
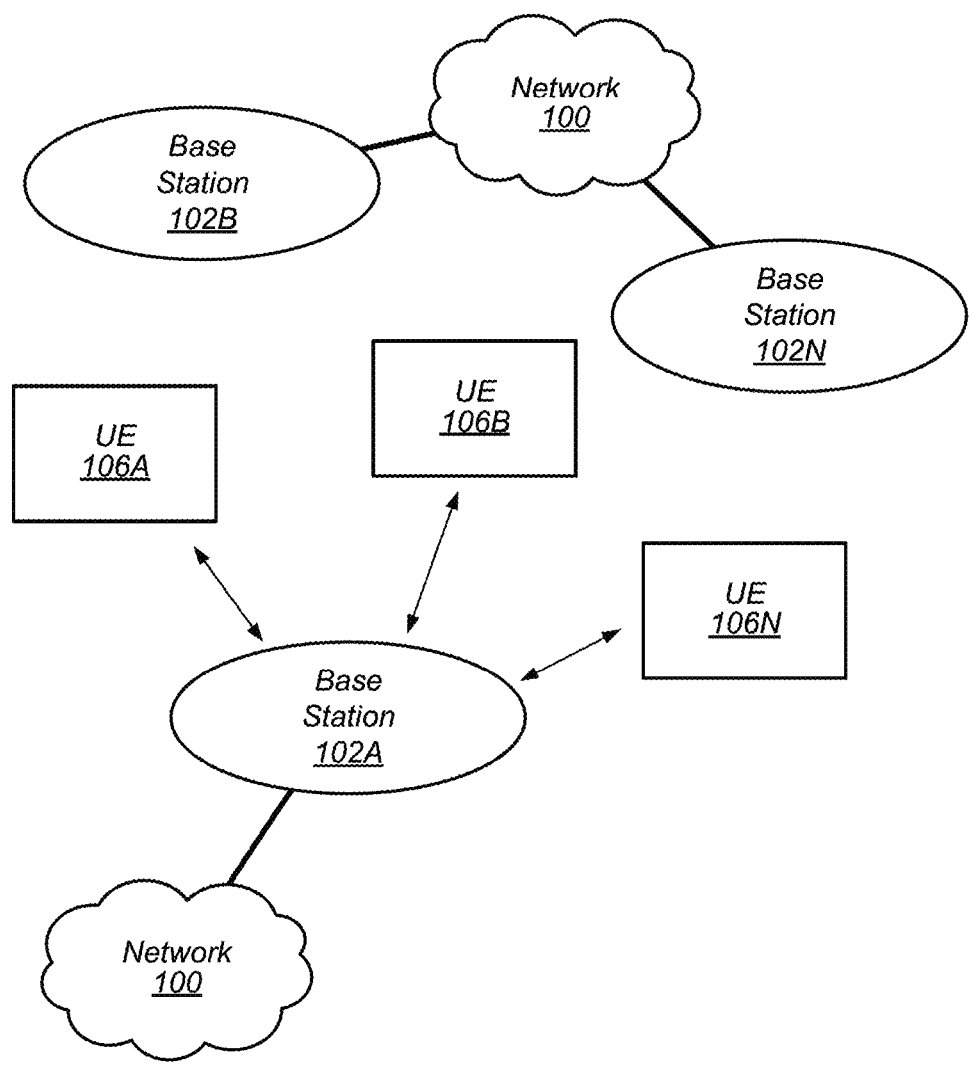
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

3GPP: Third Generation Partnership Project
UE: User Equipment
RF: Radio Frequency
BS: Base Station
DL: Downlink
CL: Uplink
LTE: Long Term Evolution
NR: New Radio
CBRS: Citizens Broadband Radio Service
DAS: Distributed Antenna System
5GS: 5G System
5GMM: 5GS Mobility Management
5GC/5GCN: 5G Core Network
SIM: Subscriber Identity Module
eSIM: Embedded Subscriber Identity Module
IE: Information Element
CE: Control Element
MAC: Medium Access Control
SSB: Synchronization Signal Block
CSI-RS: Channel State Information Reference Signal
PDCCH: Physical Downlink Control Channel
PDSCH: Physical Downlink Shared Channel
RRC: Radio Resource Control
RRM: Radio Resource Management
CORESET: Control Resource Set
TCI: Transmission Configuration indicator
DCI: Downlink Control Indicator Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a Physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect, Examples include. FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element ma also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which per wireless communications. Examples of UE devices include mobile telephones or smart Phones (e.g., iPhone™, Android™-based phones), portable gaming devices (e.g., Nintendo DS™, PlayStation Portable™, Gameboy Advance™, iPhone™), laptops, wearable devices (e.g., smart watch, smart classes), PDAs, portable Internet devices, music players, data storage devices, other handheld devices, unmanned aerial vehicles (UAVs) (e.g., drones), UAV controllers (UACs), and so forth. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" (or WiFi) has the full breadth of its ordinary meaning, and at least includes a wireless communication network or RAT that is serviced by wireless LAN (WLAN) access points and which provides connectivity through these access points to the Internet. Most modern Wi-Fi networks (Or WLAN networks) are based on IEEE 802.11 standards and are marketed under the name A Wi-Fi (WLAN) network is different from a cellular network.

3GPP Access—refers to accesses (e.g., radio access technologies) that are specified by 3GPP standards. These accesses include, but are not limited to, GSM/GPRS, LTE, LTE-A, and/or 5G NR. In general, 3GPP access refers to various types of cellular access technologies.

Non-3GPP Access—refers any accesses (e.g., radio access technologies) that are not specified by 3GPP standards. These accesses include, but are not limited to, WiMAX, CDMA2000, WiFi, WLAN, and/or fixed networks. Non-3GPP accesses may be split into two categories, "trusted" and "untrusted": Trusted non-3GPP accesses can interact directly with an evolved packet core (EPC) and/or a 5G core (5GC) whereas untrusted non-3GPP accesses interwork with the EPC/5GC via a network entity, such as an Evolved Packet Data Gateway and/or a 5G NR gateway. In general, non-3GPP access refers to various types on non-cellular access technologies.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing, on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using 'weak parallelism', where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Figure 1B:
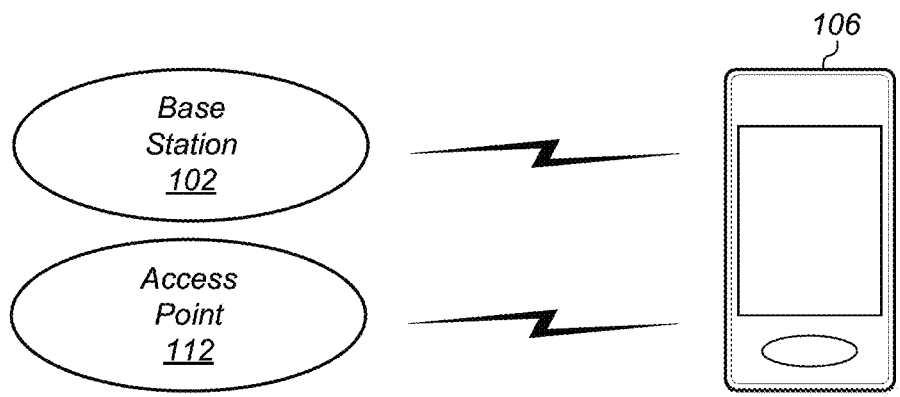
FIG. 1B illustrates an example of a base station and an access point in communication with a user equipment (UE) device, according to some embodiments.

Various components may be described as performing a task or tasks, for convenience in the description. Such descriptions should be interpreted as including the phrase "configured to" Reciting a component that is configured to perform one or more tasks is expressly intended not to invoke 35 U.S.C. § 112(f) interpretation for that component.
FIGS. 1A and 1B Communication Systems FIG. 1A illustrates a simplified example wireless communication system, according to some embodiments. It is noted that the system of FIG. 1A to is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATS), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented M the context of 5G NR, it may alternately be referred to 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area site. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UNITS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GIN SS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, and so forth) such as a mobile phone, a handheld device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 2:
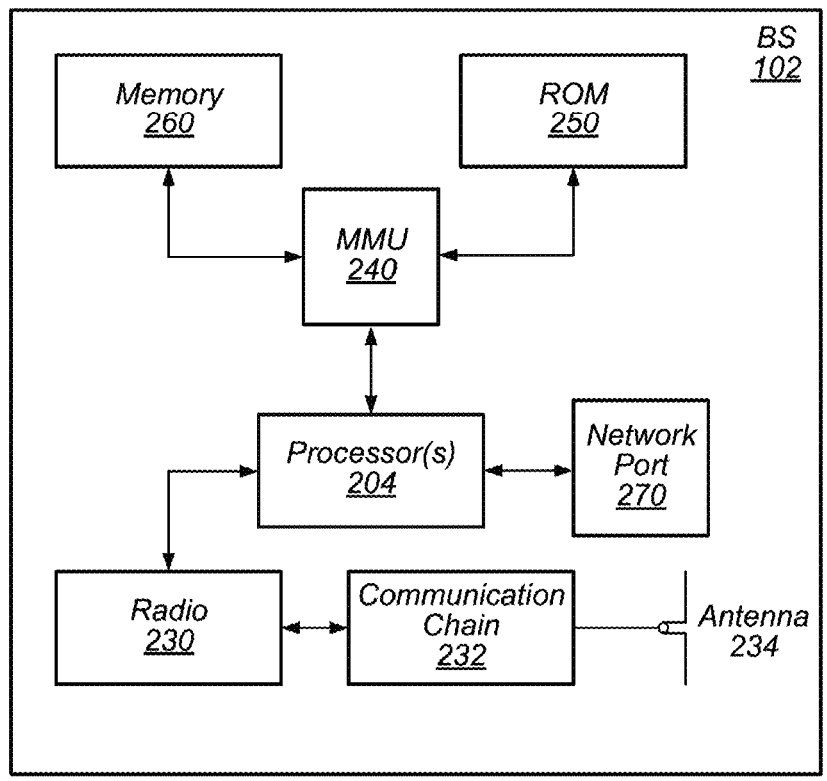
FIG. 2 illustrates an example block diagram of a base station, according to some embodiments.

FIG. 2: Block Diagram of a Base Station

Figure 3:
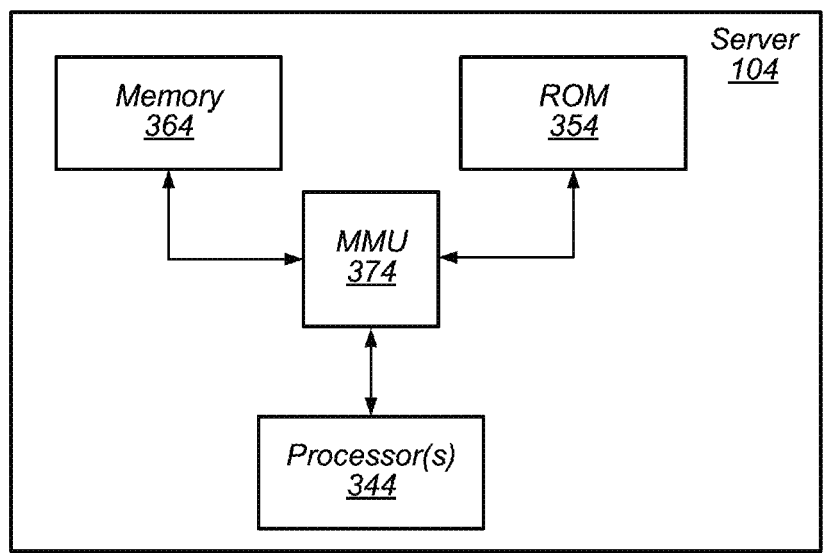
FIG. 3 illustrates an example block diagram of a server according to some embodiments.

FIG. 2 illustrates an example block diagram of a base station 102, according to some embodiments. It is noted that the base station of FIG. 3 is merely one example of a possible base station. As shown, the base station 102 may include processor(s) 204 which may execute program instructions for the base station 102. The processor(s) 204 may also be coupled to memory management unit (MMU) 240, which may be configured to receive addresses from the processor(s) 204 and translate those addresses to locations in memory (e.g., memory 260 and read only memory (ROM) 250) or to other circuits or devices.

The base station 102 may include at least one network port 270. The network port 270 may be configured to couple to a telephone network and provide a plurality of devices, such as UE devices 106, access to the telephone network as described above in FIGS. 1 and 2.

The network port 270 (or an additional network port) may also or alternatively be configured to couple to a cellular network, e.g., a core network of a cellular service provider. The core network may provide mobility related services and/or other services to a Plurality of devices, such as UE devices 106. In some cases, the network port 270 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 234, and possibly multiple antennas. The at least one antenna 234 may be configured to operate as a wireless transceiver and may be further configured to communicate with UE devices 106 via radio 230. The antenna 234 communicates with the radio 230 via communication chain 232. Communication chain 232 may be a receive chain, a transmit chain or both. The radio 230 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according, to LTE a well as a 5G NR radio for performing communication according to 5G NR. In such a case, the base station 102 may be capable of operating as both an LTE base station and a 5G NR base station. As another the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 204 of the base station 102 may be configured to implement of support implementation of part or all of the methods described herein, e.g., by executing program instructions stored on a memory medium (e.g., a non-transitory computer-readable memory medium). Alternatively, the processor 204 may be configured as a programmable hardware element, such as an FPGA (Field Programmable Gate Array), or as an ASIC (Application Specific Integrated Circuit), or a combination thereof. Alternatively (or in addition) the processor 204 of the BS 102, in conjunction with one or more of the other components 230, 232, 234, 240, 250, 260, 270 may be configured to implement or support implementation of part or all of the features described herein.

In addition, as described herein, processor(s) 204 may be comprised of one or more processing elements. In other words, one or more processing elements may be included in processor(s) 204. Thus, processor(s) 204 may include one or more integrated circuits (ICs) that are configured to perform the functions of processor(s) 204. In addition, each integrated circuit may include circuitry first circuitry, second circuitry, etc.) configured to perform the functions of processor(s) 204.

Further, as described herein, radio 230 may be comprised of one or more processing elements. In other words, one or more processing elements May be included in radio 230. Thus, radio 230 may include one or more integrated circuits (ICs) that are configured to perform the functions of radio 230. In addition, each integrated circuit may include circuitry (e.g., first circuitry, second circuitry, etc.) configured to perform the functions of radio 230.

FIG. 3: Block Diagram of a Server

FIG. 3 illustrates an example block diagram of a server 104, according to some embodiments. It is noted that the server of FIG. 3 is merely one example of a possible server. As shown, the server 104 may include processor(s) 344 which may execute program instructions for the server 104. The processors) 344 may also be coupled to memory management unit (MMU) 374, which may be configured to receive addresses from the processor(s) 344 and translate those addresses to locations in memory (e.g., memory 364 and read only memory (ROM) 354) or to other circuits or devices.

The server 104 may be configured to provide a plurality of devices, such as base station 102, UE devices 106, and/or UTM 108, access to network functions, e.g., as further described herein.

In some embodiments, the server 104 may be pan of a radio access network, such as a 5G New Radio (5G NR) radio access network. In some embodiments, the server 104 may be connected to a legacy evolved packet core (EPC) network and/or to a NR core (NRC) network.

As described further subsequently herein, the server 104 may include hardware and software components for implementing or supporting implementation of features described herein. The processor 344 of the server 104 may be configured to implement or support implementation of part or all of the methods described herein, e.g., by executing program instructions stored on a memory medium (e.g., a non-transitory computer-readable memory medium). Alternatively, the processor 344 may be configured as a programmable hardware element, such as an FPGA (Field Programmable Gate Array), or as an ASIC (Application Specific Integrated Circuit), or a combination thereof. Alternatively (or in addition) the processor 344 of the server 104, in conjunction with one or more of the other components 354, 364, and/or 374 may be configured to implement or support implementation of part or all of the features described herein.

In addition, as described herein, processor(s) 344 may be comprised of one or more processing elements. In other words, one or more processing elements may be included in processor(s) 344. Thus, processor(s) 344 may include one or more integrated circuits (ICS) that are configured to perform the functions of processors) 344. In addition, each integrated circuit may include circuitry (e.g., first circuitry, second circuitry, etc.) configured to perform the functions of processor(s) 344.

Figure 4:
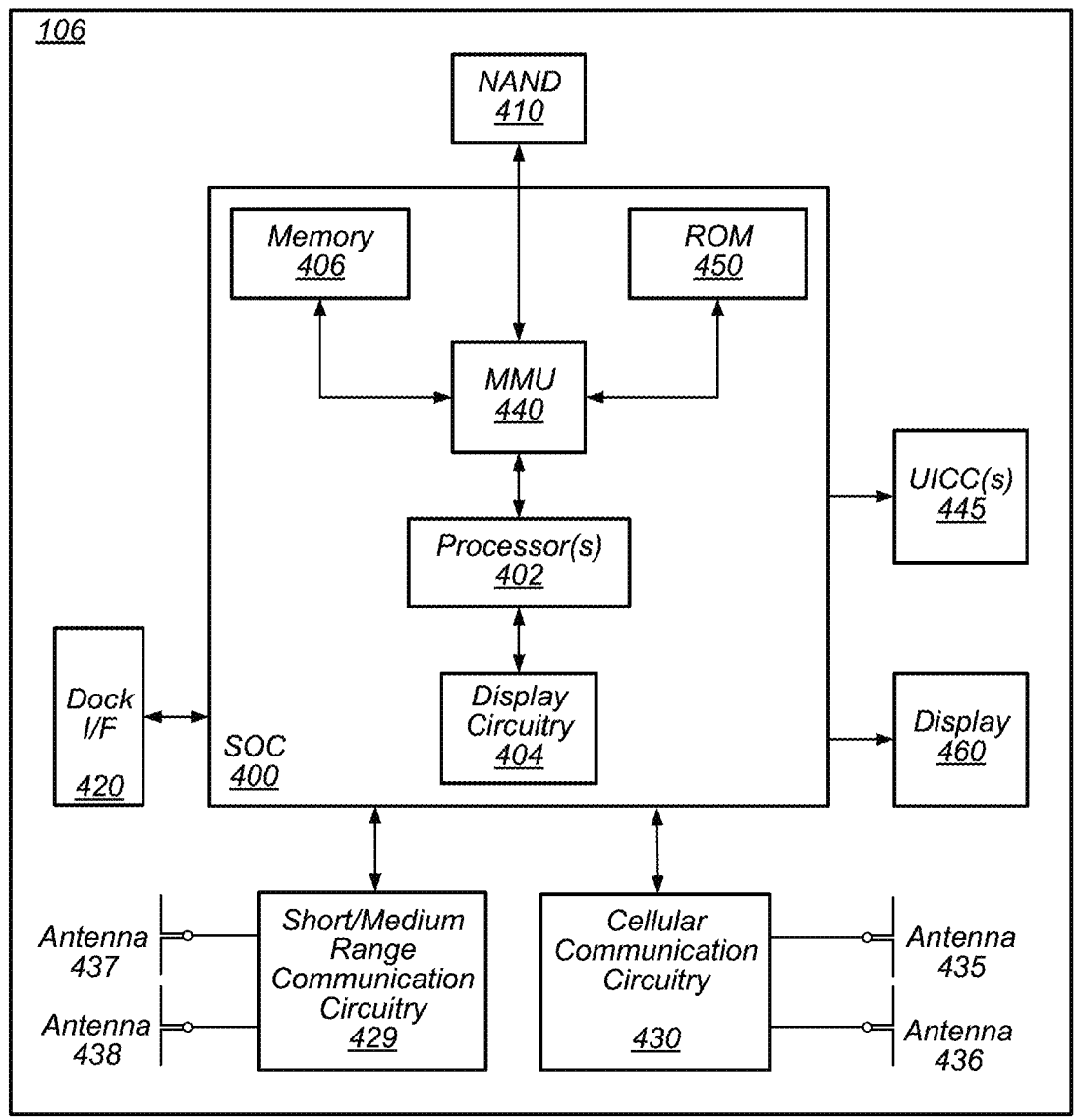
FIG. 4 illustrates an example block diagram of a UE according to some embodiments.

FIG. 4: Block Diagram of a UE

FIG. 4 illustrates an example simplified block diagram of a communication device 106, according to some embodiments. It is noted that the block diagram of the communication device of FIG. 4 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, an unmanned aerial vehicle (UAV), a UAV controller (UAC) and/or a combination of devices, among other devices. As Shown, the communication device 106 may include a set of components 400 configured to perform core functions. For example, this set of components may be implemented as a system on chip (SOC), which may include portions for various purposes. Alternatively, this set of components 400 may be implemented as separate components or groups of components for the various purposes. The set of components 400 may be coupled (e.g., communicatively; directly or indirectly) to various other circuits of the communication device 106.

For example, the communication device 106 may include various types of memory (e.g., including NAND flash 410), an input/output interface such as connector I/F 420 (e.g., for connecting to a computer system; dock; charging station; input devices, such as a microphone, camera, keyboard; output devices, such as speakers; etc.), the display 460, Which may be integrated with or external to the communication device 106, and cellular communication circuitry 430 such as for 5G NR, LTE, GSM, etc., and short to medium range wireless communication circuitry 429 (e.g., Bluetooth™ and WLAN circuitry). In some embodiments, communication device 106 may include wired communication circuitry (not shown), such as a network interface card, e.g., for Ethernet.

The cellular communication circuitry 430 may couple (e.g., communicatively; directly or indirectly) to one or more antennas, such as antennas 435 and 436 as shown. The short to medium range wireless communication circuitry 429 may also couple (e.g., communicatively; directly or indirectly) to one or more antennas, such as antennas 437 and 438 as shown. Alternatively, the short to medium range wireless communication circuitry 429 may couple (e.g., communicatively; directly or indirectly) to the antennas 435 and 436 in addition to, or instead of, coupling (e.g., communicatively; directly or indirectly) to the antennas 437 and 438. The short to medium range wireless communication circuitry 429 and/or cellular communication circuitry 430 may include multiple receive chains and/or multiple transmit chains for receiving and/or transmitting multiple spatial streams, such as in a multiple-input multiple output (MIMO) configuration.

In some embodiments, as further described below, cellular communication circuitry 430 may include dedicated receive communication circuitry 430 may include dedicated receive chains (including and/or coupled to, e.g., communicatively; directly or indirectly. dedicated processors and/or radios) for multiple RATS (e.g., a first receive chain for LTE and a second receive chain for 5G NR). In addition, in some embodiments, cellular communication circuitry 430 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 460 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 445 that include SIM (Subscriber identity Module) functionality, such as one or more UICC(s) (Universal Integrated Circuit Card(s)) cards 445. Note that the term "SIM" or "SIM entity" is intended to include any of various types of SIM implementations or SIM functionality, such as the one or more UICC(s) cards 445, one or more eUICCs, one or more eSIMs, either removable or embedded, etc. In some embodiments, the UE 106 may include at least two SIMs. Each SIM may execute one or more SIM applications and/or otherwise implement SIM functionality. Thus, each SIM may be a single smart card that may be embedded, e.g., may be soldered onto a circuit board in the UE 106, or each SIM 410 may be implemented as a removable smart card. Thus, the SIM(s) may be one or more removable smart cards (such as UICC cards, which are sometimes referred to as "SIM cards"), and/or the SIMs 410 may be one or more embedded cards (such as embedded UICCs (eUICCs), which are sometimes referred to as "eSIMs" or "eSIM cards"). In some embodiments (such as when the SIM(s) include an eUICC), one or more of the SIM(s) may implement embedded SIM (eSIM) functionality; in such an embodiment, a single one of the SIM(s) may execute multiple SIM applications. Each or the SIMs may include components such as a processor and/or a memory; instructions for performing SIM/eSIM functionality may be stored in the memory and executed by the processor. In some embodiments, the UE 106 may include a combination of removable smart cards and fixed/non-removable smart cards (such as one or more eUICC cards that implement eSIM functionality), as desired. For example, the UE 106 may comprise two embedded SIMs, two removable SIMs, or a combination of one embedded SIMs and one removable SIMs. Various other SIM configurations are also contemplated.

As noted above, in some embodiments, the UE 106 may include two or more SINN. The inclusion of two or more SIMs in the UE 106 may allow the UE 106 to support two different telephone numbers and may allow the UE 106 to Communicate on corresponding two or more respective networks. For example, a first SIM may support a first RAT such as LTE, and a second SIM 410 support a second RAT such as 5G NR. Other implementations and RATs are of course possible. In some embodiments, when the UE 106 comprises two SIMs, the UE 106 may support Dual SIM Dual Active (DSDA) functionality. The DSDA functionality may allow the UE 106 to be simultaneously connected to two networks (and use two different RATs) at the same time, or to simultaneously maintain two connections supported by two different SIMs using the same or different RATs on the same or different networks. The DSDA functionality may also allow the UE 106 to simultaneously receive voice calls or data traffic on either phone number. In certain embodiments the voice call may be a packet switched communication. In other words, the voice call may be received using voice over LTE (VoLTE) technology and/or voice over NR (VoNR) technology. In some embodiments, the UE 106 may support Dual SIM Dual Standby (DSDS) functionality. The DSDS functionality may allow either of the two SIMs in the UE 106 to be on standby waiting for a voice call and/or data connection. In DSDS, when a call/data is established on one SIM, the other SIM is no longer active. In some embodiments, DSDx functionality (either DSDA car DSDS functionality) may be implemented with a single SIM (e.g., a eUICC) that executes multiple SIM applications for different carriers and/or RATs.

As shown, the SOC 400 may include processor(s) 402, which may execute program instructions for the communication device 106 and display circuitry 404, which may perform graphics processing and provide display signals to the display 460. The processor(s) 402 may also be coupled to memory management unit (MMU) 440, which may be configured to receive addresses from the processor(s) 402 and translate those addresses to locations in memory 406, read only memory (ROM) 450, NAND flash memory 410) and/or to other circuits or devices, such as the display circuitry 404, short to medium range wireless communication circuitry 429, cellular communication circuitry 430, connector 420, and/or display 460. The MMU 440 may be configured to perform memory protection and page table translation or set up. In some embodiments, the MMU 440 may be included as a portion of the processor(s) 402.

As noted above, the communication device 106 may be configured to communicate using wireless and/or wired communication circuitry. The communication device 106 may be configured to perform methods for revocation and/or modification of user consent in MEC, e.g., in 5G NR systems and beyond, as further described herein.

As described herein, the communication device 106 may include hardware and software components for implementing the above features for a communication device 106 to communicate a scheduling profile for power savings to a network. The processor 402 of the communication device 106 may be configured to implement part or all of the features described herein, e.g., by executing program instructions stored on a memory medium (e.g., a nova transitory computer-readable memory medium). Alternatively (or in addition), processor 402 may be configured as a programmable hardware element, such as an FPGA (Field Programmable Gate Array), or as an ASIC (Application Specific integrated Circuit). Alternatively (or in addition) the processor 402 of the communication device 106, conjunction with one or more of the other components 400, 404, 406, 410, 420, 429, 430, 440, 445, 450, 460 may be configured to implement part or all of the features described herein.

In addition, as described herein, processor 402 may include one or more processing elements. Thus, processor 402 may include one or more integrated circuits (ICs) that are configured to perform the functions of processor 402, in addition, each integrated circuit may include circuitry (e.g., first circuitry-, second circuitry, etc.) configured to perform the functions of processor(s) 402.

Further, as described herein, cellular communication circuitry 430 and short to medium range wireless communication circuitry 429 may each include one or more processing elements. In other words, one or more processing elements may be included in cellular communication circuitry 430 and, similarly, one or more processing elements may be included in short to medium range wireless communication circuitry 429. Thus, cellular communication circuitry 430 may include one or more integrated circuits (ICs) that are configured to perform the functions of cellular communication circuitry 430. In addition, each integrated circuit may include circuitry (e.g., first circuitry, second circuitry, etc.) configured to perform the functions of cellular communication circuitry 430. Similarly, the short to medium range wireless communication circuitry 429 may include one or more ICs that are configured to perform the functions of short to medium range wireless communication circuitry 429. In addition, each integrated circuit may include circuitry (e.g., first circuitry, second circuitry, etc.) configured to perform the functions of short to medium range wireless communication circuitry 429.

Figure 5:
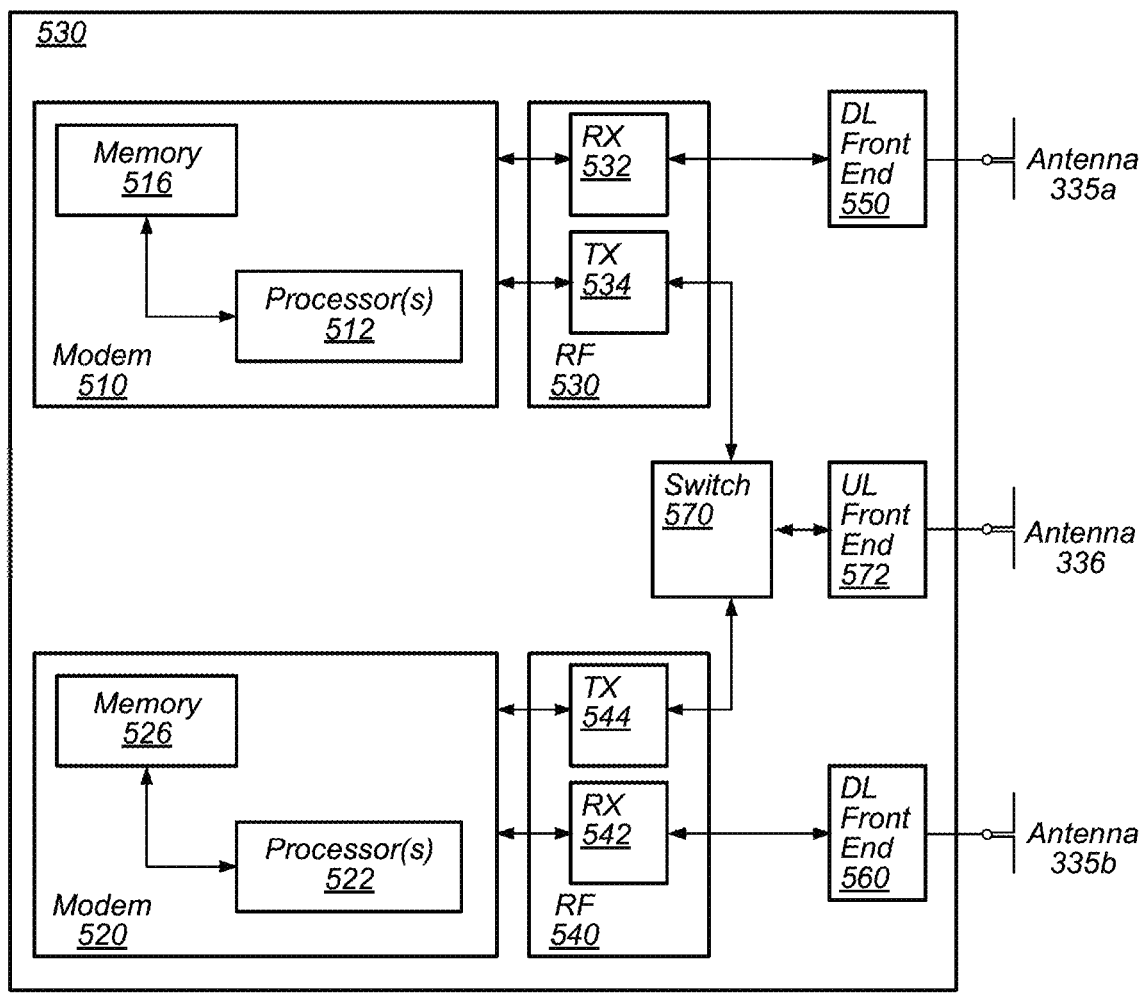
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 530, which may be cellular communication circuitry 430, may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 530 may couple (e.g., communicatively directly or indirectly) to one or more antennas, such as antennas 435*a-b* and 436 as shown (in FIG. 4). In some embodiments, cellular communication circuitry 530 may include dedicated receive chains (including and/or coupled to, e.g., communicatively; directly or indirectly, dedicated processors and/or radios) for multiple RATs (e.g., a first receive chain for LTE and a second receive chain for 5G NR). For example, as shown in FIG. 5, cellular communication circuitry 530 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RE) front end 530, RF front end 530 may include circuitry for transmitting and receiving radio signals. For example, RF front end 530 may include receive circuitry (RX) 532 and transmit circuitry (IN) 534. In some embodiments, receive circuitry 532 may be in communication with downlink (DI) front end 550, which may include circuitry for receiving radio signals via antenna 335*a*.

Similarly, modem 520 may include one or more processors 522 and a memory 526 in communication with processors 522. Modem 520 may be in communication with an RE front end 540. RE front end 540 may include circuitry for transmitting and receiving radio signals. For example, RE front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 530 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 530 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 530 may be configured to perform methods for determination and scheduling for multiple PDSCH/PUSCH operations in wireless communication, e.g., in 5G NR systems and beyond, as further described herein. For example, cellular communication circuitry 530 may be configured to perform methods for separate HARQ-ACK sub-codebook operation, for collision handling between PDSCH/PUSCH with TDD configurations, and for multi-PXSCH scheduling signaling.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more Processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for communicating a scheduling profile for power savings to a network, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Figure 6A:
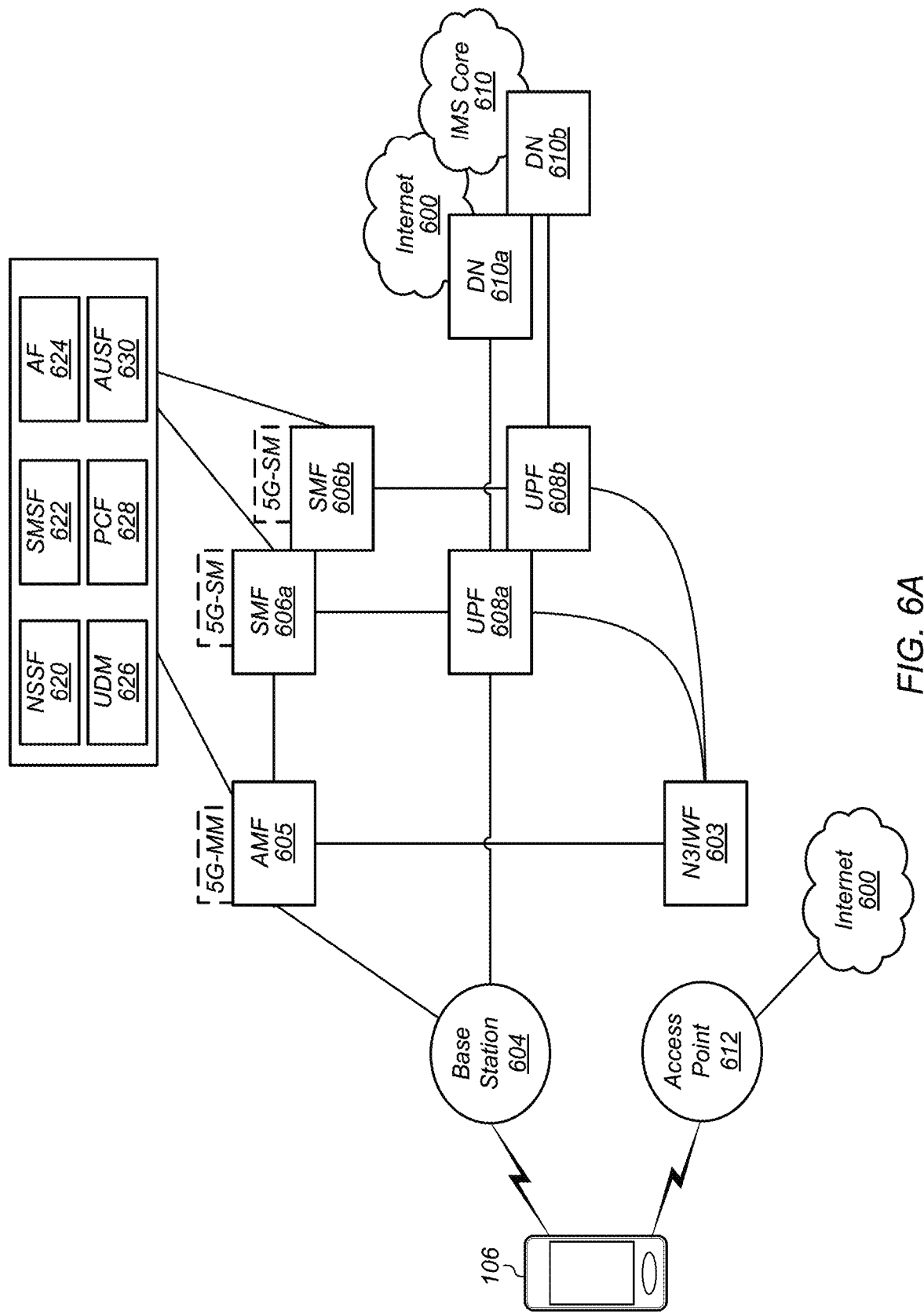
FIG. 6A illustrates an example of a 5G network architecture that incorporates both 3GPP (e.g., cellular) and non-3GPP (e.g., non-cellular) access to the 5G CN, according to some embodiments.
Figure 6B:
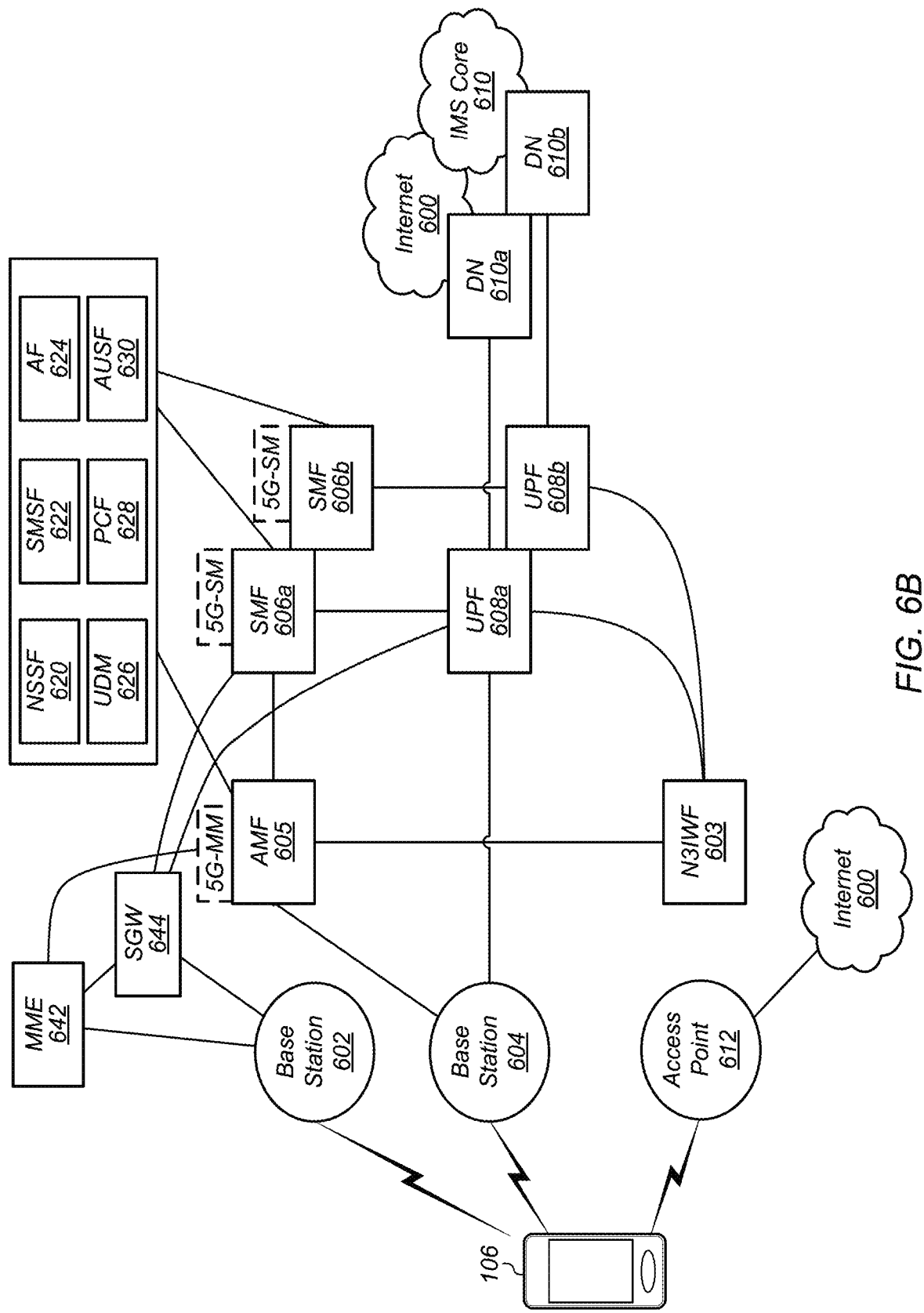
FIG. 6B illustrates an example of a 5G network architecture that incorporates both dual 3GPP (e.g., LTE and 5G NR) access and non-3GPP access to the 5G CN, according to some embodiments.
Figure 7:
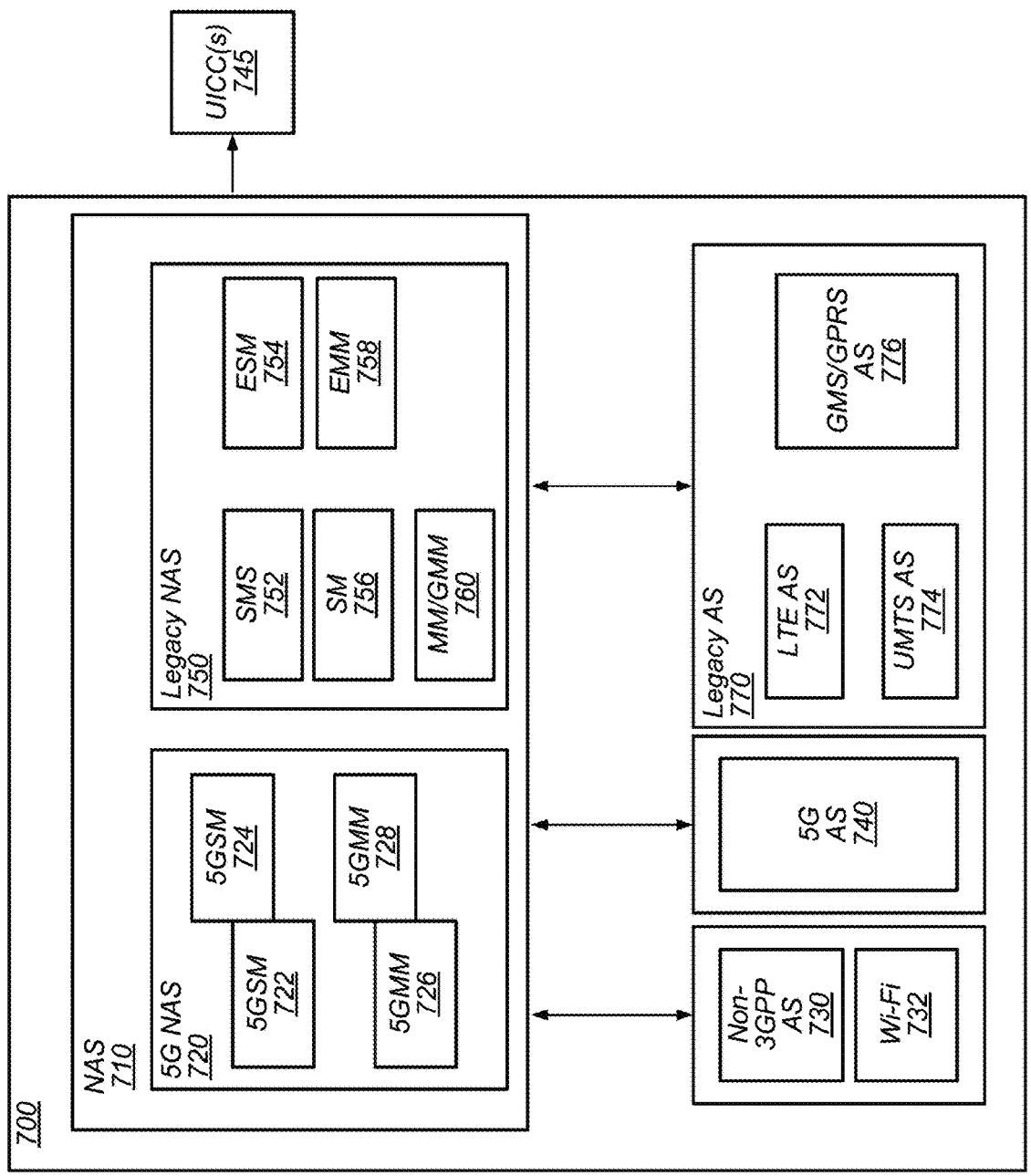
FIG. 7 illustrates an example of a baseband processor architecture for a UE, according to some embodiments.

FIGS. 6A, 6B and 7: 5G Core Network Architecture—Interworking with Wi-Fi In some embodiments, the 5G core network (CN) may be accessed via (or through) cellular connection/interface (e.g., via a 3GPP communication architecture/protocol) and a non-cellular connection interface (e.g., a non-3GPP access architecture/protocol such as Wi-Fri connection). FIG. 6A illustrates an example of a 5G network architecture that incorporates both 3GPP (e.g., cellular) and non-3GPP (e.g., non-cellular) access to the 5G CN, according to some embodiments. As shown, a user equipment device (e.g., such as UE 106) may access the 5G CN through both a radio access network (RAN, e.g., such as gNB 604, which may be a base station 102) and an access point, such as AP 612. The AP 612 may include a connection to the Internet 600 as well as a connection to a non-3GPP inter ogling function (N3IWF) 603 network entity. The N3IWF may include a connection to a core access and mobility management function (AMP) 605 of the 5G CN. The AMF 605 may include an instance of a 5G mobility management (5G MM) function associated with the UP 106. In addition, the RAN (e.g., gNB 604) may also have a connection to the AMF 605. Thus, the 5G CN may support unified authentication over both connections as well as allow simultaneous registration for UP 106 access via both gNB 604 and AP 612. As shown, the AMF 605 may include one or more functional entities associated with the 5G CN (e.g., network slice selection function (NSSF) 620, short message service function (SMSF) 622, application function (AF) 624, unified data management (UDM) 626, policy control function (PCF) 628, and/or authentication server function (AUSF) 630). Note that these functional entities may also be supported by a session management function (SMF) 606a and an SMF 606b of the 5G CN. The AMF 605 may be connected to (or in communication with) the SMF 606a. Further, the gNB 604 may in communication with (or connected to) a user plane function (UPF) 608a that may also be communication with the SMF 606a. Similarly, the N3IWF 603 may be a communicating with UPF 608b that may also be communicating with the SMF 606b. Both UPFs may be communicating with the data network (e.g., DN 610a and 610b) and/or the Internet 600 and Internet Protocol (IP) Multimedia Subsystem/IP Multimedia Core Network Subsystem (IMS) core network 610.

FIG. 6B illustrates an example of a 5G network architecture that incorporates both dual 3GPP (e.g., LTE and 5G NR) access and non-3GPP access to the 5G CN, according to some embodiments. As shown, a user equipment device (e.g., such as UP 106) may access the 5G CN through both a radio access network (RAN, e.g., such as gNB 604 or eNB 602, which may be a base station 102) and an access point, such as AP 612. The AP 612 may include a connection to the Internet 600 as well as a connection to the N3IWF 603 network entity. The N3IWF may include a connection to the SMF 605 of the 5G CN. The AMF 605 may include an instance of the 5G MM function associated with, the UE 106. In addition, the RAN (e.g., gNB 604) may also have a connection to the AMF 605. Thus, the 5G CN may support unified authentication over both connections as well as allow simultaneous registration for UE 106 access via both gNB 604 and AP 612. In addition, the 5G CN may support dual-registration of the UE on both a legacy network (e.g., LTE via eNB 602) and a 5G network (e.g., via gNB 604). As shown, the eNB 602 may have connections to a mobility management entity (MME) 642 and a serving gateway (SGW) 644. The MME 642 may have connections to both the SGW 644 and the AMF 605. In addition, the SOW 644 may have connections to both the SMF 606a and the UPF 608a. As Shown, the AMF 605 may include one or more functional entities associated with the 5G CN (e.g., NSSF 620, SMSF 622, AF 624, UDM 626, PCI F 628, and/or AUSF 630). Note that UDM 626 may also include a home subscriber server (HSS) function and be PCP may also include a policy and charging rules function (PCRF). Note further that these functional entities may also be supported by the SMF 606a and the SMF 606b of the 5G CN. The AMF 605 may be connected to (or in communication with) the SMF 606a. Further, the gNB 604 may in communication with (or connected to) the UPF 608a that may also be communication with the SMF 606a. Similarly, the N3IWF 603 may be communicating with a UPF 608b that may also be communicating with the SMF 606b. Both UPFs may be communicating with the data network (e.g., DN 610a and 610b) and/or the Internet 600 and IMS core network 610.

Note that in carious embodiments, one or more of the above-described network entities may be configured to perform methods for determination and scheduling for multiple PDSCH/PUSCH operations in wireless communication, e.g., in 5G NR systems and beyond, e.g., as further described herein. For example, one or more of the above-described network entities may be configured to perform methods for separate HARQ-ACK sub-codebook operation, for collision handling between PDSCH/PUSCH with TDD configurations, and for multi-PXSCH scheduling signaling.

FIG. 7 illustrates an example of a baseband processor architecture for a UE (e.g., such gas UE 106), according to some embodiments. The baseband processor architecture 700 described in FIG. 7 may be implemented on one or more radios (e.g., radios 429 and/or 431) described above) or modems (e.g., modems 510 and/or 520) as described above. As shown, the non-access stratum (NAS) 710 may include a 5G NAS 720 and a legacy NAS 750. The legacy NAS 750 may include a communication connection with a legacy access stratum (AS) 770. The 5G NAS 721) may include communication connections with both a 5G AS 740 and a non-3GPP AS 730 and Wi-Fi AS 732. The 5G SAS 720 may include functional entities associated with both access stratums. Thus, the 5G NAS 720 may include multiple 5G MM entities 726 and 728 and 5G session management (SM) entities 722 and 724. The legacy NAS 750 may include functional entities such as short message service (SMS) entity 752, evolved packet system (EPS) session management (ESM) entity 754, session management (SM) entity 756, EPS mobility management (EMM) entity 758, and mobility management (MM)/GPRS mobility management (GMM) entity 760. In addition, the legacy AS 770 may include functional entities such as LTE AS 772, UNITS AS 774, and/or GSM/GPRS AS 776.

Thus, the baseband processor architecture 700 allows fora common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an Idle state in another access and vice versa. Finally, there may be common 5G-MM procedures (e.g., registration, de-registration, identification, authentication, as so forth) for both accesses.

Note that in various embodiments, one or more of the above-described functional entities of the 5G NAS and/or 5G AS may be configured to perform methods for determination and scheduling for multiple PDSCH/PUSCH operations in wireless communication, e.g., in 5G NR systems and beyond, e.g., as further described herein. For example, one or more of the above-described functional entities may be configured to perform methods for separate HARQ-ACK sub-codebook operation, for collision handling between PDSCH/PUSCH with TDD configurations, and for multi-PIXSCH scheduling signaling.

Determination and Scheduling for Multiple PDSCH/PUSCH Operations

In current implementations, cellular systems, e.g., such as 5G NR systems, may be configured to operate on frequencies up to 71 gigahertz (GHz) considering both licensed and unlicensed operation. Additionally, cellular systems may support a single DCI for multi-PDSCH/multi-PUSCH scheduling and hybrid automatic repeat request (HARQ). For example, in current 5G NR, multiple HARQ ACK bits corresponding, to multiple PDSCHs scheduled by a single DCI can be multiplexed using a dynamic codebook and transmitted in same PUCCH or PUSCH resource. Further, to handle codebook size misalignment between a base station and a UE caused by DCI misdetection at UE side, 5G NR introduces a counter downlink assignment index (C-DAI) and total downlink assignment index (T-DAI) fields in the scheduling DCI. More specifically, two bits are used for each downlink assignment index (DAI) field and numbering may wrap around with modulo four operation. Thus, with 2-bit C-DAI and T-DAI, a misaligned HARQ-ACK codebook size may only occur when the UE misses three consecutive DCIs, e.g., a $10^{-6}$ probability assuming $10^{-2}$ PDCCH miss detection rate. However, for multi-PDSCH scheduling where a number of PDSCHs are scheduled by a single DCI, issues arise on how to report the corresponding HARQ feedback efficiently and reliably.

Multiple proposals for DAI counting to support HARQ-ACK feedback in multiple PDSCH scheduling have been considered. For example, one proposal is that C-DAI/T-DAI is counted per DCI as in release 15 and/or release 16. Another proposal is that C-DAI/T-DAI is counted per scheduled PDSCH. As a further example, a third proposal is that C-DAI/T-DAI is counted per M scheduled PDSCHs, where M is a configurable parameter. In addition, regarding counting C-DAI/T-DAI per DCI as in GPP release 15 and/or release 16, if this proposal is adopted for generating type-2 HARQ-ACK codebook corresponding to a DCI that can schedule multiple. PDSCHs, at least two sub-code oaks can be generated for a PUCCH cell group, where a fast sub-codebook would cover that case in which a DCI is configured with a TDRA table containing at least one row with multiple SLIVs and schedules multiple PDSCHs.

However, there are multiple open remaining issues. For example, how to determine the first sub-codebook and/or how to handle HARQ process numbering for PDSCH or PUSCH when they, collide with symbols with different direction indicated by the tdd-UL-DL-ConfigurationCommon parameter or tdd-UL-DL-ConfigurationDedicated parameter.

Embodiments described herein provide systems, methods, and mechanisms to support determination and scheduling for multiple PDSCH/PUSCH operations in wireless communication. For example, embodiments may include systems, methods, and mechanisms far separate HARQ-ACK sub-codebook operation, for collision handling between PDSCH/PUSCH with TDD configurations, and for multi-PXSCH scheduling signaling. Thus, embodiments described herein address the above described issues by providing methods for a UE to determine a codebook for HARQ-ACK. Further, embodiments described herein provide methods for a UE to determine HARQ process numbering for PDSCH or PUSCH when they are scheduled for symbols that collide with symbols with different direction indicated by a TDD configuration, e.g., PDSCH scheduled for a TTD uplink symbol and/or a PUSCH scheduled of a TDD downlink symbol.

Note that a common disadvantage for some of the proposals described above is overhead of HARQ-ACK bits since a fixed number of HARQ-ACK bits were generated for a multi-PDSCH scheduling irrespective of an actual number of scheduled PDSCHs. Thus, in some embodiments, to obviate such a disadvantage, component carriers (CCS) configured for a given UE may be divided into two groups based on a maximum number of PDSCHs in a multi-PDSCH scheduling that can be scheduled by a single DCI. Additionally, a threshold (e.g., $N_{PDSCH}$) may be provided to a UE in one of various manners. Note that if a threshold value is not provided, the UE may assume a single HARQ-ACK codebook is used for multi-PDSCH and single PDSCH reception. In some embodiments, a single value of the threshold may be indicated as part of a SIB1 message and applied for all of UEs camping on a cell. Such a scheme may be advantageous for its simplicity and may be technically feasible for cells with relatively small size and UEs having similar signal-to-noise ratio (SNR) geometry and traffic characteristics. In some embodiments, a set of values may be first configured as candidate threshold values for a given UE. Then, one of these configured values may be selected for HARQ-ACK codebook generated by a MAC-CE or DCI formats. Note that for a DCI-based approach, one field may be added into an existing scheduling DCI Format to dynamically indicate a value of the threshold. As another option, a group-specific DCI for a number of UEs may be introduced to signal a value of the threshold for each UE. For example, a UE may be provided a field index by radio resource control (RRC) signaling to determine the location of a field in the group-specific DCI to obtain the value of the threshold. In addition, a maximum number of addressable PDSCHs by a single DCI for a given CC index may be denoted as $N_{MAX,i}$, e.g., based on an RRC configuration (e g., a number of separate time-domain resource allocation (TDRA) elements associated with a TDRA field in a scheduling DCI format). Then, configured CCs may be divided into two groups based on the maximum number of addressable PDSCHs by a single DCI for a given CC index (e.g., $N_{MAX,i}$) and the threshold ($N_{PDSCH}$). For example, a CC with index, i, may be included in a CC group #1 when $N_{MAX,i}$ is less than or equal to $N_{PDSCH}$ and may be included in a CC group #2 when $N_{MAX,i}$ is greater than $N_{PDSCH}$. Once divided into CC groups, a HARQ-ACK sub-codebook may be determined for each group. As a first example, a HARQ-ACK sub-codebook #1 may include HARQ-ACK bits for PDSCHs scheduled on CCs of group #1. As a second example, a HARQ-ACK sub-codebook #1 may include HARQ-ACK bits for PDSCHs scheduled on CCs of group #2 when a number of actually scheduled PDSCH is smaller than the threshold. As a third example, a HARQ-ACK sub-codebook #1 may include a single PDSCH only regardless of whether it is transmitted in CC group #1 or group #2 when a fallback DCI Format 1_0 is used for scheduling. In other words, HARQ-ACK bits for PDSCH scheduled by a fallback DCI are always included in the sub-codebook #1. As a fourth example, a HARQ-ACK sub-codebook #1 may include HARQ-ACK bits for a PDCCH that is used for semi-persistently scheduled PDSCH release or secondary cell (SCell) dormancy indication. Note that a value of a counter DAI (C-DAI) and a total DAI (T-DAI) in DCI Format may be accumulated or counted across all valid {CC, PDCCH Monitoring Occasion}-pair(s) in which PDSCH receptions or PDCCH belongs to one of the above examples across CCs in not only CC group #1 but also in CC group #2. Note that in all other instances, HARQ-ACK bits for PDSCHs not covered by the above examples may be added int at HARQ- ACK sub-codebook #2. After determining the HARQ-ACK sub-codebooks, HARQ-ACK sub-codebook concatenation may be performed. For example, sequentially concatenating HARQ-ACK sub-codebook #1 and sub-codebook #2 may be in a hard-encoded order, e.g., HARQ-ACK sub-codebook 5 may be placed first.

Figure 8:
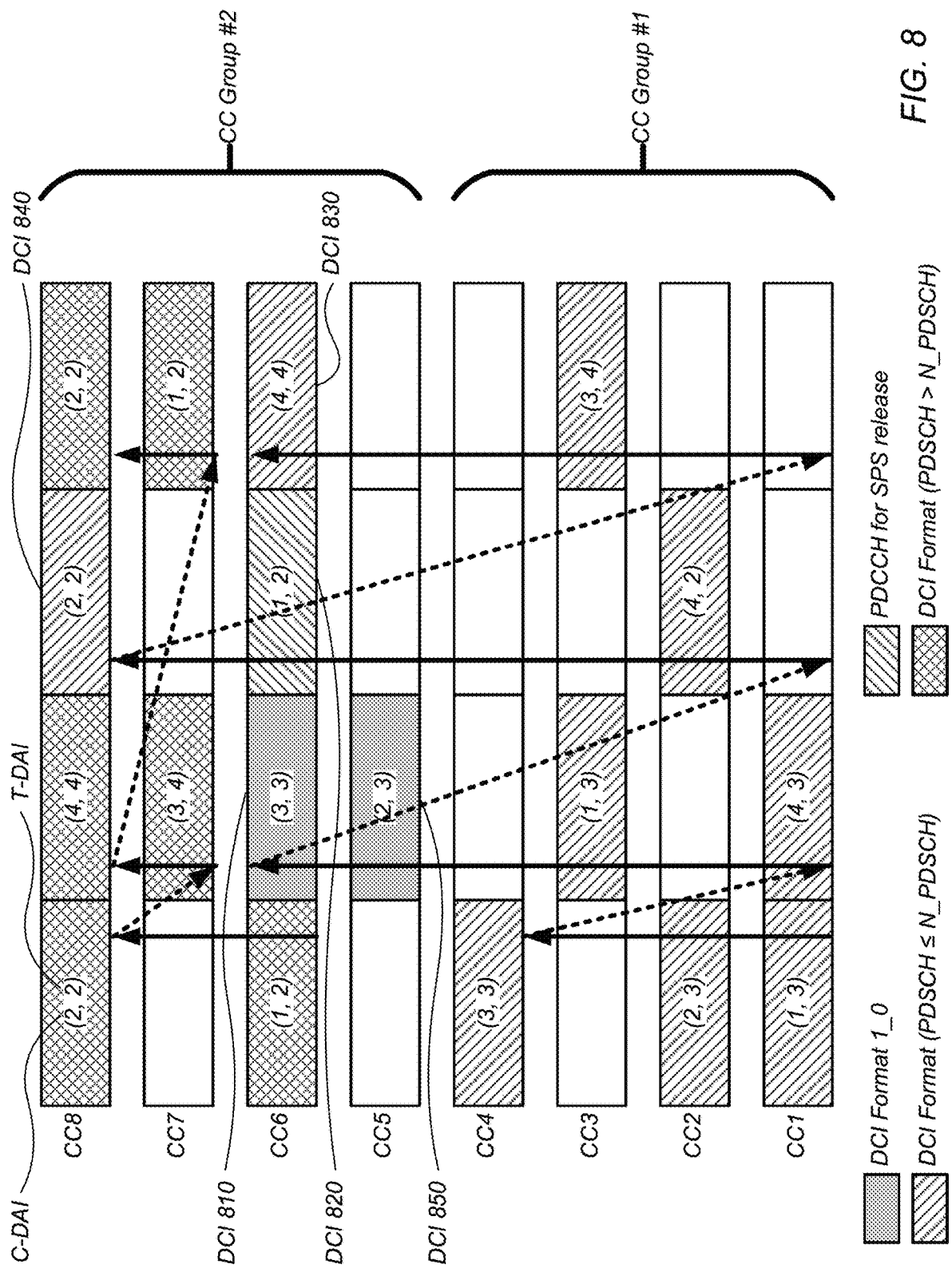
FIG. 8 illustrates an example of C-DAI and T-DAI setting for separate codebooks, according to some embodiments.
Figure 9:
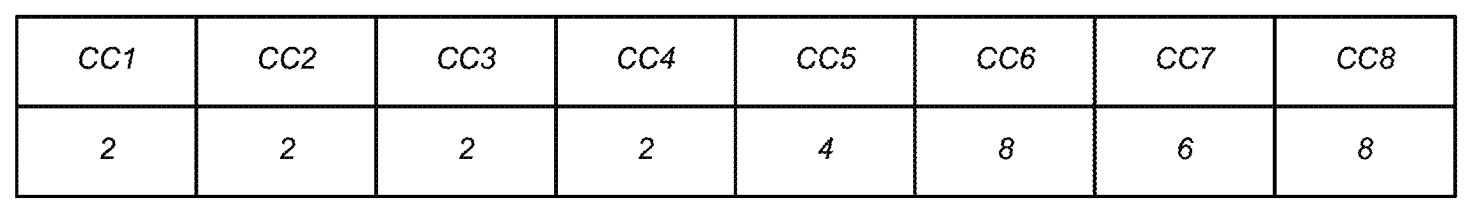

FIG. 8 illustrates an example of C-DAI and T-DAI setting for separate codebooks, according to some embodiments. As shown, a UE, such as UE 106, may be configured with 8 CCs and may count C-DAI and T-DAI per scheduling DCI. Further, a threshold may be set to a value of 2, e.g., $N_{PDSCH}=2$ and a maximum number of addressable PDSCHs by a single DCI for a given CC index (e.g., $N_{MAX,i}$) may be configured based on the table illustrated by FIG. 9, which is an example of a table for determining a maximum number of addressable PDSCHs by a single DCI for a given CC index for different CCs, according to some embodiments. Additionally, based on the CC grouping schemed described above, CC group #1 may include CC1, CC2, CC3, and CC4 and CC group #2 may include CC5, CC6, CC7, and CC8 as shown in FIG. 8. As shown, fallback DCI formats 810 and 850 may be transmitted on CC6 and CC5, respectively. Further, DCI format 820, transmitted on CC6, may be used for semi-persistent scheduling (SPS) release and DCI format 840, transmitted on CC8, and DCI format 830 transmitted on CC6, may schedule PDSCHs. In addition, HARQ-ACK bits for PDSCH(s) in CC group #1 and HARQ-ACK bits for DCI formats 810, 820, 830, 840, and 850 of CCs in CC group #2 may be included in HARQ-ACK sub-codebook #1. Note that values of C-DAI and T-DAI may be counted across CCs not only in CC group #1 but also in CC group #2 as long as it belongs to one of four examples described above. Note further, that based on FIG. 8, UE may generate $N_{PDSCH}=2$ HARQ-ACK bits for PDSCH scheduled by DCI formats 810, 820, 830, 840, and 850 although the DCIs were transmitted on CCs of CC group #2. Thus, comparing to a single HARQ-ACK codebook operation, a sin of HARQ-ACK bits payload for these DCI may be reduced from 40 bits to 10 bits. In particular, HARQ-ACK sub-codebooks based on FIG. 8 would be generated as follows for the 8 CCs:

HARQ-ACK sub-codebook 411 the UE may generate 24 bits for all PDSCHs on CCs in Group #1 and PDSCHs scheduled by DCI formats 810, 820, 830, 840, and 850. HARQ-ACK sub-code book #2: the UE may generate 6*max ($N_{MAX,5}$, $N_{MAX,6}$, $N_{MAX,7}$, $N_{MAX,8}$)=48 bits. Then, the two HARQ-ACK sub-codebooks may be concatenated by placing the HARQ-ACK sub-codebook #1 before the HARQ-ACK sub-codebook #2.

Note that in 3GPP Release 15 and Release 16, only 2-bit C-DAI is present in fallback DCI Format 1_0 without T-DAI. One possible solution for HARQ-ACK feedback of multi-PDSCH scheduling then is to increase bit-width of C-DAI and T-DAI to ensure that missing up to 3 consecutive DCI formats would not cause HARQ-ACK codebook size mis-alignment between a base station and a UE. However, extension of C-DAI is not impossible for fallback DCI Format 1_0 at least for CSS due to size alignment with legacy broadcast DCI. Thus, according to some embodiments, two HARQ-ACK sub-codebooks may be created assuming a C-DAI and T-DAI field size are extended and counted per PDSCH. For example, a HARQ-ACK sub-codebook #1 may be used to convey the HARQ-ACK bits for PDSCH that is scheduled by fallback DCI 1_0. Similarly, a HARQ-ACK sub-codebook #2 may be used to convey the HARQ-ACK bits for PDSCH(s) that is scheduled by non-fallback DCI with extended C-DAFT-DAI field for multi-PDSCH scheduling. Note that these two HARQ-ACK sub-codebooks may be concatenated. Additionally, these two HARQ-ACK sub-codebooks and may be transmitted over a single PUCCH resource and/or may not be multiplexed and may be transmitted over separate PUCCH resources.

Figure 10A:
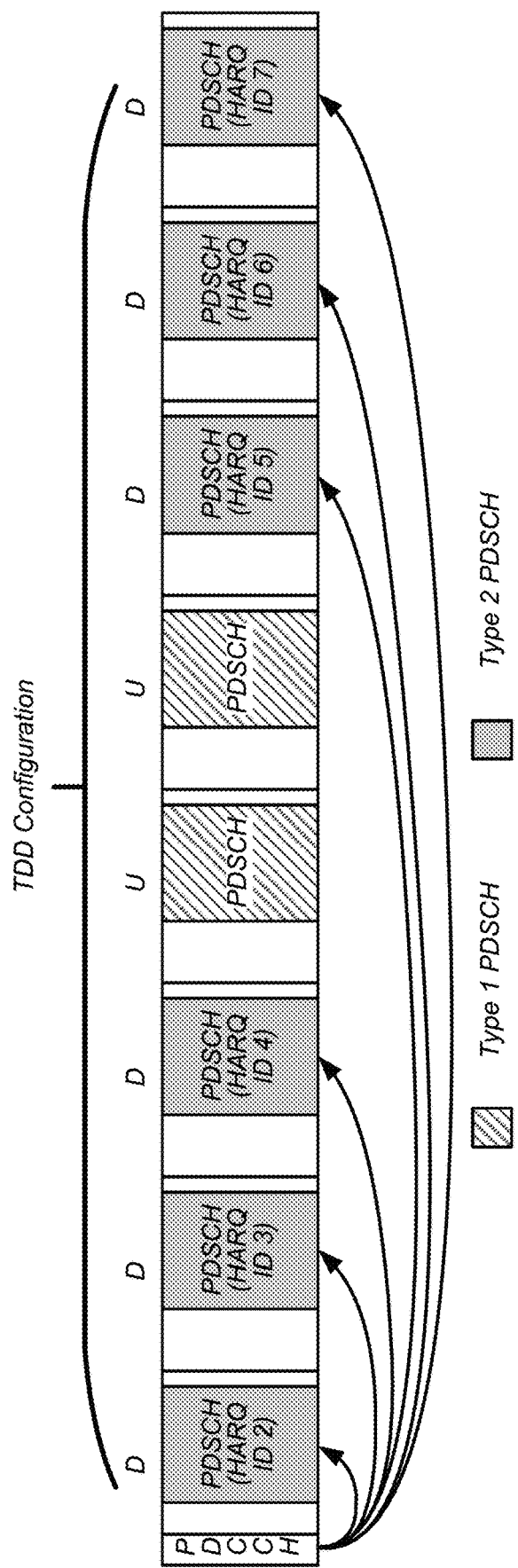
FIGS. 10A and 10B illustrate examples of collision handling between PDSCH and PUSCH with TDD configurations, according to some embodiments.
Figure 10B:
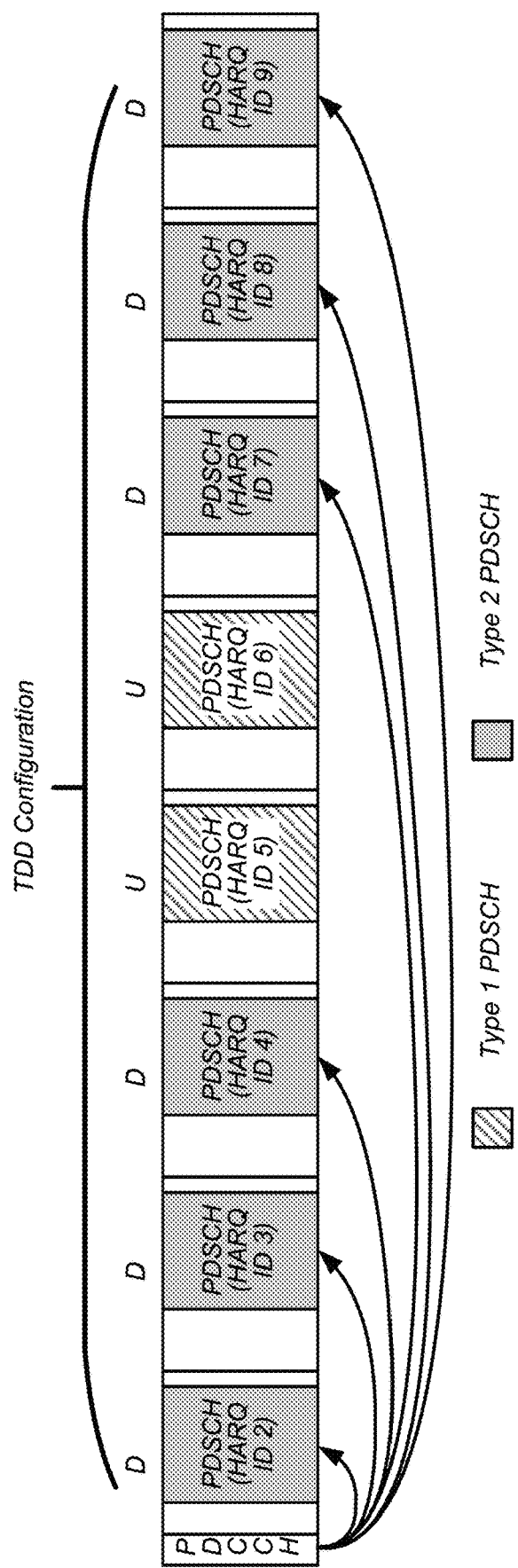

In some embodiments, two types of PDSCH/PUSCH may be defined for multi-PDSCH/multi-PUSCH scheduling. For example, a first type, e.g., type1 PDSCH/type1 PUSCH, may be defied for a PDSCH/PUSCH among multi-PDSCHs/Multi-PUSCHs that are scheduled by a single DCI and collide with uplink/downlink symbol(s) indicated by tdd-UL-DL-ConfigurationCommon or tdd-UL-DL-ConfigurationDedicated. As another example, a second type, e.g., type2 PDSCH/type2 PUSCH, may be defined for remaining PDSCH/PUSCH among multi-PDSCHs/multi-PUSCHs that are not scheduled by a single DCI and collide with uplink/downlink symbol(s) indicated by a tdd-UL-DL-ConfigurationCommon or a tdd-UL-DL-ConfigurationDedicated parameter. In addition, for HARQ process numbering and HARQ-ACK bits generation, a HARQ process number may be incremented over type2 PDSCH/PUSCH. In other words, type1 PDSCH/PUSCH may not be counted for HARQ process increment operation. Correspondingly, a UE does not generate HARQ-ACK bit(s) for the type2 PDSCH for both type-1 and type-2 HARQ-ACK codebook determination. For example, as illustrated by FIG. 10A, HARQ process IDs may be counted only for type2 PDSCHs. Thus, for a time division duplex (TDD) configuration of 3 downlinks slots followed by 2 uplink slots and 3 downlink slots (e.g., (D, D, D, U, U, D, D, D), only type2 PDSCHs corresponding to downlink slots may increment a HARQ process ID. Alternatively, for HARQ process numbering and HARQ-ACK bits generation, a HARQ process number may be incremented over both type1 and type2 PDSCH/PUSCH. In such instances, a UE may generate HARQ-ACK bits for all types of PDSCH. In particular, the UE may set a value for each corresponding HARQ-ACK information bit to NACK for type1 PDSCH. Note that such a scheme may be advantageous as it may fix a HARQ-ACK payload at least for type1 HARQ-ACK codebook and potentially simplify UE implementation. For example, as illustrated by FIG. 10B, HARQ process IDs may counted for both type1 PDSCHs and type2 PDSCHs. Thus, for a time division duplex (TDD) configuration of 3 downlinks slots followed by 2 uplink slots and 3 downlink slots (e g., (D, D, D, D, U, U, D, D, D), both type1 PDSCHs and type2 PDSCHs may increment a HARQ process ID.

Figures 11A, 11B:
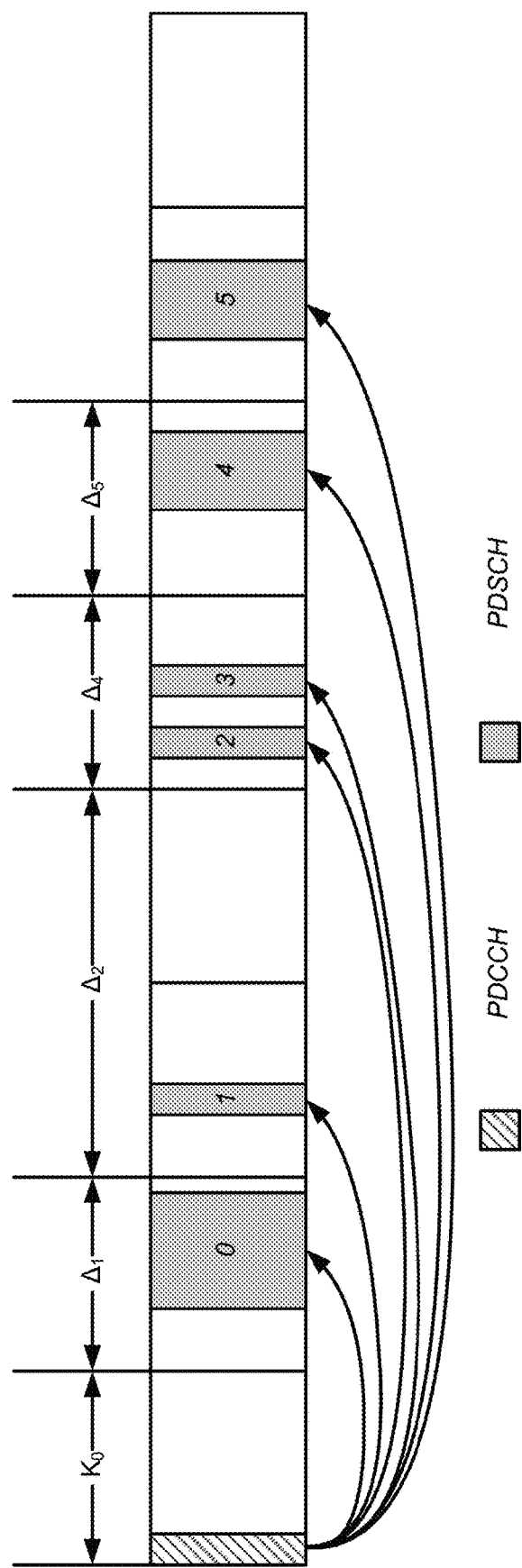
FIG. 11A illustrates an example of multi-PDSCH scheduling, according to some embodiments.
FIG. 11B illustrates an example of a table specifying a value of K0 and a value of an offset based on a PDSCH index, according to some embodiments.

In some embodiments, various approaches may be considered to indicate a gap between two consecutively scheduled PDSCHs/PUSCHs by a single DCI. For example, a single K0/K2 value for a first PDSCH/PUSCH and an additional gap offset value between PDSCH/PUSCH per start and length indicator value (SLIV) may be used to indicate the gap. Note that the offset value may be counted in units of OFDM symbols or in units of slots. For example, as illustrated by FIG. 11A, illustrates an example of multi-PDSCH scheduling in a single slot with K0=1. As shown, PDSCHs 2 and 3 may be located in the same slot, which can be enabled by setting $\Delta_3$ to a value of 0 as shown in FIG. 11B, which illustrates a table specifying K0 and an offset based on PDSCH index, according to some embodiments. As another example, a separate K0/K2 value for each PDSCH/PUSCH per SLIV may be used to indicate the gap.

Note that multiple PDSCH/PUSCHs scheduled by a single DCI in a single slot may be supported for 120 kHz, 480 kHz and 960 kHz SCS or a subset of these (e.g., only for 120 kHz SCS and not support 480 kHz and 960 kHz SCSs to address concerns of UE complexity and bookkeeping). Additionally, support of multi-PDSCH/PUSCH may be subject to UE capability/feature report on a per SCS basis. In some embodiments, it may be further limited to a given deployment scenario, e.g., single transmit-receive point (s-TRP) or multiple TRPs (m-TRP).

In some embodiments, to support multi-PUSCH scheduling with a single DCI spread over non-contiguous slots, art inter-slot frequency hopping pattern may be determined for multi-PUSCH transmission. First, a UE may index valid PUSCH transmission occasions scheduled h a single DCI by 'i' where i≥0 (e.g., after excluding invalid occasions that have different direction configured by a tdd-UL-DL-ConfigurationCommon parameter or a tdd-UL-DL-ConfigurationDedicated parameter). Then, the UE, in case of inter-slot hopping, a starting RB of a PUSCH transmission occasion index i, where i is the PUSCH index within a multi-PUSCH that is scheduled by a single DCI. The starting RB, represented by $RB_{start}$, within an uplink (UL) bandwidth part (BWP) is provided by a DCI format and $RB_{offset}$ is a frequency offset in RBs between two frequency hops may defined as shown in equation [1]:

$$RB_{start} = \begin{bmatrix} RB_{start} & i \bmod 2 = 0 \\ (RB_{start} + RB_{offset}) \bmod N_{\substack{size \\ BWP}} & i \bmod 2 = 1 \end{bmatrix} \cdot \quad [1]$$

Figure 12:
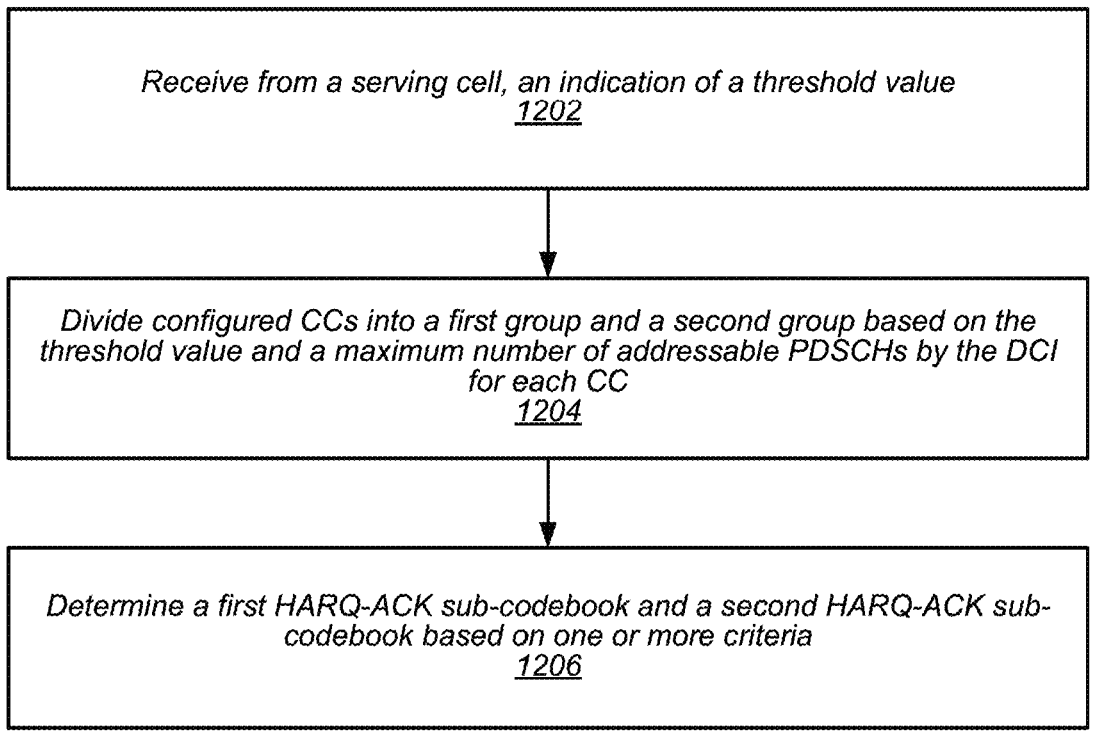
FIG. 12 illustrates an example of a block diagram for a method for scheduling for multiple PDSCH/PUSCH operations, according to some embodiments.

FIG. 12 illustrates an example of a block diagram for a method for scheduling for multiple PDSCH/PUSCH operations, according to some embodiments. The method shown in FIG. 12 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1202, a UE, such as 106, may receive, from a serving cell, an indication of a threshold value, e.g., a maximum number of physical downlink shared channels (PDSCHs) in a multi-PDSCH schedule that can be scheduled by a downlink control indicator (DCI). The indication may be received via a system information block (SIB) 1 message. Alternatively, the indication may be received via a medium access control (MAC) control element (CE), e.g., by selecting a threshold value from a set of threshold values configured via radio resource control (RRC) signaling. Further, the indication is received via the DCI, e.g., by selecting, a threshold value from a set of threshold values configured via radio resource control (RRC) signaling. Additionally, the indication may be received via a group specific DCI. In such instances, the UE may receive an index a DCI field index) via radio resource control (RRC) signaling to locate a position of the indication within the group-specific DCI.

At 1204, the UE may divide configured component carriers (CCS) into a first group and a second group based on the threshold value and a maximum number of address able PDSCHs by the DCI for each CC. In some embodiments, dividing configured CCs into the first group and the second group based on the threshold value and the maximum number of addressable PDSCHs by the DCI for each CC may include the UE, to the first group, each CC that has a maximum number of addressable PDSCHs by the DCI that is less than or equal to the maximum number of PDSCHs in a multi-PDSCH schedule that can be scheduled by the DCI and the UE adding, to the second group, each CC that has a maximum number of addressable PDSCHs by the DCI that is greater than the maximum number of PDSCHs in a multi-PDSCH schedule that can be scheduled by the DCI.

At 1206 the UE may determine a first hybrid automatic repeat request (HARQ) acknowledgement (ACK) sub-codebook and a second HARQ-ACK sub-codebook based on one or more criteria, e.g., based, at least in part, on dividing the configured CCs into the first group and the second group. In some embodiments, determining the first HARQ-ACK sub-codebook and the second HARQ-ACK sub-codebook based on one or more criteria may include the UE adding, to the first HARQ-ACK sub-codebook, HARQ-ACK bits for PDSCHs scheduled on CCs in the first group, HARQ-ACK bits for a number of PDSCHs scheduled on CCs in the second group that is less than or equal to the threshold value, HARQ-ACK bits for PDSCHs scheduled by a fallback DCI regardless of whether the PDSCH is transmitted on a CC in the first group or on a CC in the second group, and HARQ-ACK bits for a physical downlink control channel (PDCCH) used for semi-persistent scheduling PDSCH release or secondary cell dormancy indication and the UE adding, to the second HARQ-ACK sub-codebook, any remaining HARQ-ACK bits not added to the first HARQ-ACK sub-codebook.

In some embodiments, the UE may sequentially concatenate the first HARQ-ACK sub-codebook and the second HARQ-ACK sub-codebook. The concatenation may include placing the first HARQ-ACK sub-codebook before the second HARQ-ACK sub-codebook.

In some embodiments, the UE may increment a counter downlink assignment index (C-DAI) and a total DAI (T-DAI) for each valid [CC, physical downlink control channel (PDCCH) monitoring occasion] pair in Which PDSCH reception or PDCCH that is included in the first HARQ-ACK sub-codebook.

In some embodiments, the UE may define a first type of physical downlink shared channel physical uplink shared channel (PDSCH/PUSCH) for multi-PDSCH/multi-PUSCH scheduling and define a second type of PDSCH/PUSCH for multi-PDSCH/multi-PUSCH scheduling. Additionally, the TIE may receive/transmit only the second type of PDSCH/PUSCH. In some embodiments, the UE may increment a hybrid automatic repeat request (HARQ) process number only over the second type of PDSCH/PUSCH. In some embodiments, the UE may increment a hybrid automatic repeat request (HARQ) process number over the first type of PDSCH/PUSCH and the second type of PDSCH/PUSCH and generate HARQ acknowledgement (ACK) bits for the first type of PDSCH/PUSCH and the second type of PDSCH/PUSCH. Note that the HARQ-ACK bits corresponding to the first type of PDSCH/PUSCH may be set to not ACK (NACK). In some embodiments, the first type of PDSCH may include PDSCHs of the Multi-PDSCHs that are scheduled by a downlink control indicator (DCI) to collide with uplink symbols as indicated by a time division duplex (TDD) configuration. The second type of PDSCH may include PDSCHs of the multi-PDSCHs that are scheduled by the DCI and do not collide with uplink symbols as indicated by the TDD configuration. In some embodiments, the first type of PUSCH may include PUSCHs of the multi-PUSCHs that are scheduled by a downlink control indicator (DCI) to collide with downlink symbols as indicated by a time division duplex (TDD) configuration. The second type of PUSCH may, include PUSCHs of the multi-PUSCHs that are scheduled by the DCI and do not collide with downlink symbols as indicated by the TDD configuration.

In some embodiments, the UE may receive, from the serving cell, a downlink control indicator (DCI) that schedules multiple PDSCHs/PUSCHs and determine a gap between consecutively scheduled PDSCHs/PUSCHs based on at least one K0/K2 value. The at least one K0/K2 value may be a K0/K2 value for a first PDSCH/PUSCH and determining the gap between consecutively scheduled PDSCHs/PUSCHs may be further based on an additional gap offset value between PDSCHs/PUSCHs per start and length indicator value. In some embodiments, the at least one K0/K2 value may include a K0/K2 value for each PDSCH/PUSCH per start and length indicator value.

In some embodiments, the UE may index valid physical uplink control channel (PUSCH) transmission occasions, e.g., within the multi-PUSCHs that are scheduled by a single DCI, and determine a starting resource block (RB) of a PUSCH transmission occasion based on an index of the PUSCH within the multi-PUSCH that is scheduled by the single DCI and a starting PRB and RB offset between two frequency hops that are provided by the single DCI.

Figure 13:
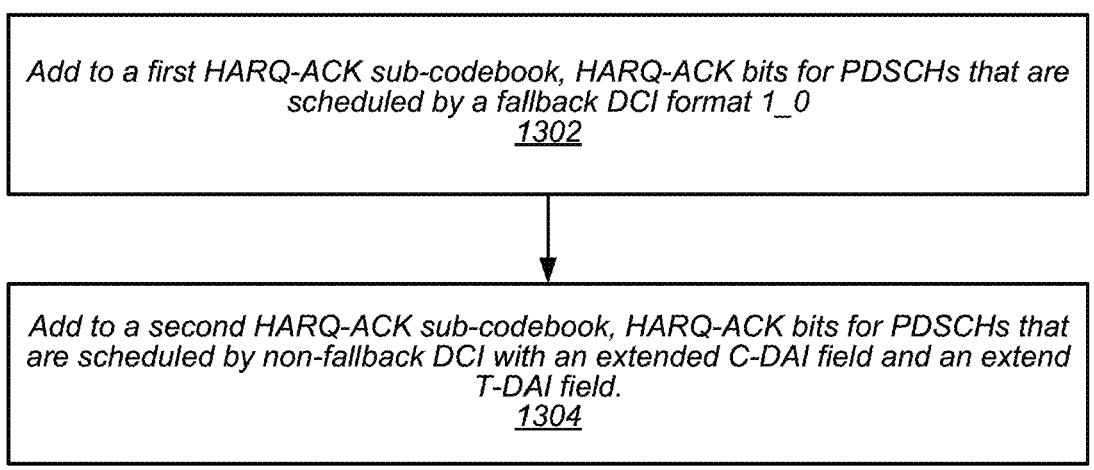
FIG. 13 illustrates an example of a block diagram for a method for determining a first HARQ-ACK sub-codebook and a second HARQ-ACK sub-codebook its multi-PUSCH scheduling, according to some embodiments.

FIG. 13 illustrates an example of a block diagram fora method for determining a first HARQ-ACK sub-codebook and a second HARQ-ACK sub-codebook multi-PUSCH scheduling, according to some embodiments. The method shown in FIG. 13 may be used in conjunction with any of the systems, methods, or devices shown in the Figures, among other devices. In various embodiments, some of the method elements shown may be performed concurrently, in a different order than shown, or may be omitted. Additional method elementsmay also be performed as desired. As shown, this method may operate as follows.

At 1302, a UE, such as UE 106, may acid to the first HARQ-ACK sub-codebook, HARQ-ACK bits for physical downlink shared channels (PDSCHs) that are scheduled by a fallback DCI format 1_0.

At 1304, the UE may add to the second HARQ-ACK sub-codebook-, HARQ-ACK bits for PDSCHs that are scheduled by non-fallback DCI with an extended counter downlink assignment index (C-DAI) field and an extended total DAI (T-DAI) field. The extended C-DAI field may have a size greater than two bits. Additionally, the extended T-DAI field may have a size greater than two bits.

In some embodiments, the first HARQ-ACK sub-codebook and second HARQ-ACK sub-codebook may be concatenated to generate a concatenated HARQ-ACK codebook. The UE may then transmit, over one physical uplink shared channel (PUSCH) resource, the concatenated HARQ-ACK codebook.

In some embodiments, the UE may transmit, over a first physical uplink shared channel (PUSCH) resource, the first HARQ-ACK sub-codebook. Additionally, the UE may transmit, over a second PUSCH resource, the second HARQ-ACK sub-codebook.

In some embodiments, the UE may define a first type of physical downlink shared channel/physical uplink shared channel (PDSCH/PUSCH) for multi-PDSCH/multi-PUSCH scheduling and define a second type of PDSCH/PUSCH for multi-PDSCH/multi-PUSCH scheduling. Additionally, the UE may receive/transmit only the second type of PDSCH/PUSCH. In some embodiments, the UE may increment a hybrid automatic repeat request (HARQ) process number only over the second type of PDSCH/PUSCH. In some embodiments, the UE may increment a hybrid automatic repeat request (HARQ) process number over the first type of PDSCH/PUSCH and the second type of PDSCH/PUSCH and generate HARQ acknowledgement (ACK) bits for the first type of PDSCH/PUSCH and the second type of PDSCH/PUSCH. Note that the HARQ-ACK bits corresponding to the first type of PDSCH/PUSCH may be set to not ACK (NACK). In some embodiments, the first type of PDSCH may include PDSCHs of the multi-PDSCHs that are scheduled by a downlink control indicator (DCI) to collide with uplink symbols as indicated by a time division duplex (TDD) configuration. The second type of PDCCH may include PDSCHs of the multi-PDSCHs that are scheduled by the DCI and do not collide with uplink symbols as indicated by the TDD configuration. In some embodiments, the first type of PUSCH may include PUSCHs of the multi-PUSCHs that are scheduled by a downlink control indicator (DCI) to collide with downlink symbols as indicated by a time division duplex ODD) configuration. The second type of PUSCH may include PUSCHs of the multi-PUSCHs that are scheduled by the DCI and do not collide with downlink symbols as indicated by the TDD configuration.

In some embodiments, the UE may receive, from the serving cell, a downlink control indicator (DCI) that schedules multiple PDSCHs/PUSCHs and determine a gap between consecutively scheduled PDSCHs/PUSCHs based on at least one K0/K2 value. The at least one K0/K2 value may be a K0/K2 value for a first PDSCH/PUSCH and determining the gap between consecutively scheduled PDSCHs/PUSCHs may be further based on an additional gap offset value between PDSCHs/PUSCHs per start and length indicator value. In some embodiments, the at least one K0/K2 value may include a K0/K2 value for each PDSCH/PUSCH per start and length indicator value.

In some embodiments, the UE may index valid physical uplink control channel (PUSCH) transmission occasions, e.g., within the multi-PUSCHs that are scheduled by a single DCI, and determine a starting resource block (RB) of a PUSCH transmission occasion based on an index of the PUSCH within the multi-PUSCH that is scheduled by the single DCI and a starting PRB and an RB offset between two frequency bops that are provided by the single DCI.

Figure 14:
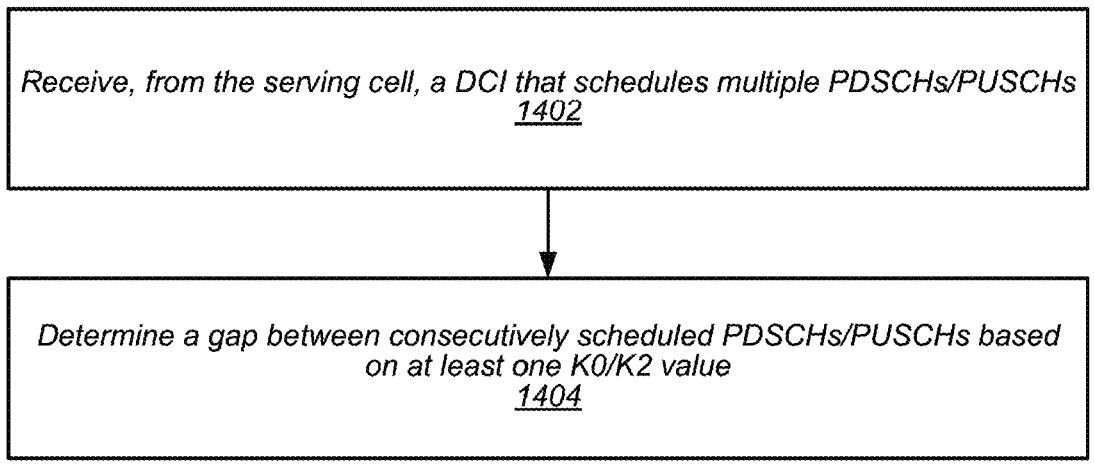
FIG. 14 illustrates an example of a block diagram for a method for determining a first HARQ-ACK sub-codebook and a second HARQ-ACK sub-codebook multi-PUSCH scheduling, according to some embodiments.

FIG. 14 illustrates an example of a block diagram for a method for determining a first HARQ-ACK sub-codebook and a second HARQ-ACK sub-codebook in multi-PUSCH scheduling, according to some embodiments. The method shown in FIG. 14 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1402, a UE, such as UE 106, may receive, from the serving cell, a downlink control indicator (DCI) that schedules multiple PDSCHs/PUSCHs.

At 1404, the UE may determine a gap between consecutively scheduled PDSCHs/PUSCHs based on at least one K0/K2 value. The at least one K0/K2 value may be a K0/K2 value for a first PDSCH/PUSCH and determining the gap between consecutively scheduled PDSCHs/PUSCHs may be further based on an additional gap offset value between PDSCHs/PUSCHs per start and length indicator value. In some embodiments, the at least one K0/K2 value may include a K0/K2 value for each PDSCH/PUSCH per start and length indicator value.

In some embodiments, the UE may define a first type or physical downlink shared channel/physical uplink shared channel (PDSCH/PUSCH) for multi-PDSCH/multi-PUSCH scheduling and define a second type of PDSCH/PUSCH for multi-PDSCH/multi-PUSCH scheduling, Additionally, the UE may receive/transmit only the second type of PDSCH/

PUSCH. In some embodiments, the UE may increment a by paid automatic repeat request (HARQ) process number only over the second type of PDSCH/PUSCH. In some embodiments, the UE may increment a hybrid automatic repeat request (HARQ) process number over the first type of PDSCH/PUSCH and the second type of PDSCH/PUSCH and generate HARQ acknowledgement (ACK) bits for the first type of PDSCH/PUSCH and the second type of PDSCH/PUSCH. Note that the HARQ-ACK bits corresponding to the first type of PDSCH/PUSCH may be set to not ACK (NACK). In some embodiments, the first type of PDCCH may include PDCCHs of the multi-PDSCHs that are scheduled by a downlink control indicator (DCI) to collide with uplink symbols as indicated by a time division duplex (TDD) configuration. The second type of PDCCH may include PDCCHs of the multi-PDSCHs that are scheduled by the DCI and do not collide with uplink symbols as indicated by the TDD configuration. In some embodiments, the first type of PUCCH may include PUSCHs of the multi-PUSCHs that are scheduled by a downlink control indicator (DCI) to collide with downlink symbols as indicated by a time division duplex (TDD) configuration. The second type of PUSCH may include PUSCHs of the multi-PUSCHs that are scheduled by the DCI and do not collide with downlink symbols as indicated by the TDD configuration.

In some embodiments, the UE may index valid physical uplink control channel (PUSCH) transmission occasions, e.g., within the multi-PUSCHs that are scheduled by a single DCI, and determine a starting resource block (RB) of a PUSCH transmission occasion based on an index of the PUSCH within the multi-PUSCH that is scheduled by the single DCI and a starting PRB and data RB offset between two frequency hops that are provided by the single DCI.

In some embodiments, the UE may add to the first HARQ-ACK sub-codebook, HARQ-ACK bits for physical downlink shared channels (PDSCHs) that are scheduled by a fallback DCI format 1_0. Additionally, the UE may add to the second HARQ-ACK sub-codebook, HARQ-ACK bits for PDSCHs that are scheduled by non-fallback DCI with an extended counter downlink assignment index (C-DAI) field and an extended total DAI (T-DAI) field. The extended C-DAI field may have a size greater than two bits. Additionally, the extended T-DAI field may have a size greater than two hubs, in some embodiments, the first HARQ-ACK sub-codebook and second HARQ-ACK sub-codebook may be concatenated to generate a concatenated HARQ-ACK codebook. The UE may then transmit, over one physical uplink shared channel (PUSCH) resource, the concatenated HARQ-ACK codebook. In some embodiments, the UE may transmit, over a first physical uplink shared channel (PUSCH) resource, the first HARQ-ACK sub-codebook. Additionally, the UE may transmit, over a second PUSCH resource, the second HARQ-ACK sub-codebook.

In some embodiments, the UE may receive, from the serving cell, an indication of a threshold value, e.g., a maximum number of physical downlink shared Channels (PDSCHs) in a multi-PDSCH schedule that can be scheduled by a downlink control indicator (DCI). The indication may be received via a system information block (SIB) 1 message. Alternatively, the indication limy be received via a medium access control (MAC) control element (CE), e.g., by selecting a threshold value from a set of threshold values configured via radio resource control (RRC) signaling. Further, the indication is received via the DCI, e.g., by selecting a threshold value from a set of threshold values configured via radio resource control (RRC) signaling. Additionally, the indication may be received via a group-specific DCI. In such instances, the UE may receive an index (e.g., a DCI field index) via radio resource control (RRC) signaling to locate a position of the indication within the group-specific DCI. Additionally, the UE may divide configured component carriers (CCs) into a first group and a second group based on the threshold value and a maximum number of addressable PDSCHs by the DCI for each CC. In some embodiments, dividing configured CCs into the first group and the second group based on the threshold value and the maximum number of addressable PDSCHs by the DCI for each CC may include the UE, to the first group, each CC that has a maximum number of addressable PDSCHs by the DCI that is less than or equal to the maximum number of PDSCHs in a multi-PDSCH schedule that can be scheduled by the DCI and the UE adding, to the second group, each CC that has a maximum number of addressable PDSCHs by the DCI that is greater than the maximum number of PDSCHs in a multi-PDSCH schedule that can be scheduled by the DCI. Further, the UE may determine a first hybrid automatic repeat request (HARQ) acknowledgement (ACK) sub-codebook and a second HARQ-ACK sub-codebook based on one or more criteria, e.g., based, at least in part, on dividing the configured CCs into the first group and the second group. In some embodiments, determining the first HARQ-ACK sub-codebook and the second HARQ-ACK sub-codebook based on one or more criteria may include the UE adding, to the first HARQ-ACK sub-codebook, HARQ-ACK bits for PDSCHs scheduled on CCs in the first group HARQ-ACK bits for a number of PDSCHs scheduled on CCs in the second group that is less than or equal to the threshold value, HARQ-ACK bits for PDSCHs scheduled by a fallback DCI regardless of whether the PDSCH transmitted on a CC in the first group or on a CC in the second group, and HARQ-ACK bits for a physical downlink control channel (PDCCH) used for semi-persistent scheduling PDSCH release or secondary cell dormancy indication and the UE adding, to the second HARQ-ACK sub-codebook, any remaining HARQ-ACK bits not added to the first HARQ-ACK sub-codebook. In some embodiments, the UE may sequentially concatenate the first HARQ-ACK sub-codebook and the second HARQ-ACK sub-codebook. The concatenation may include placing the first HARQ-ACK sub-codebook before the second HARQ-ACK sub-codebook.

In some embodiments, the UE May increment a counter downlink assignment index (C-DAI) and a total DAI (T-DAI) for each valid [CC, physical downlink control channel (PDCCH) monitoring occasion] pair in which PDSCH reception or PDCCH that is included in the first HARQ-ACK sub-codebook.

Figure 15:
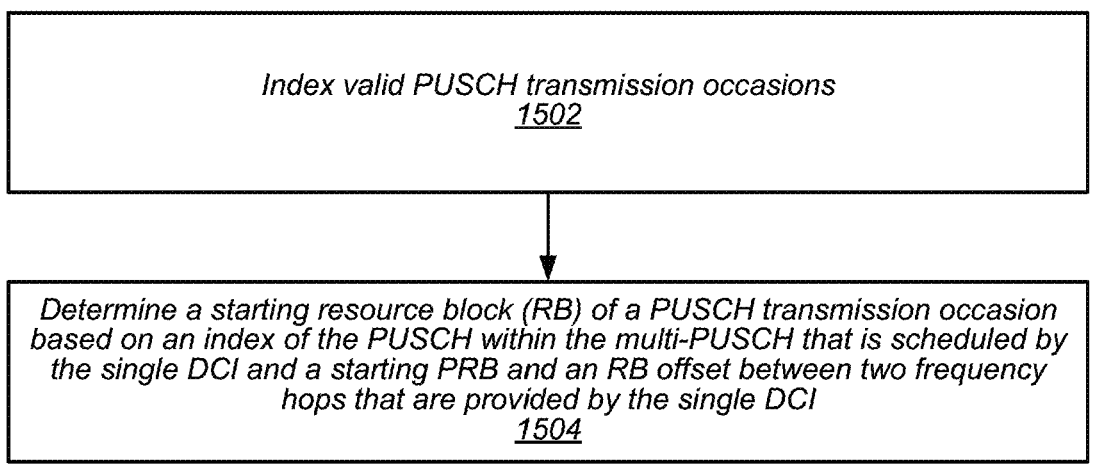
FIG. 15 illustrates an example of a block diagram for a method for determining an inter-slot frequency hopping for multi-PUSCH transmission, according to some embodiments.

FIG. 15 illustrates an example of a block diagram for a method for determining an inter-slot frequency hopping for multi-PUSCH transmission, according to some embodiments. The method shown in FIG. 14 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1502, a UE, such a UE 106, may index valid physical uplink control channel (PUSCH) transmission occasions, e.g., within the multi-PUSCHs that are scheduled by a single DCI.

At 1504, the UE may determine a starting resource block (RB) of a PUSCH transmission occasion based on an index of the PUSCH within the multi-PUSCH that is scheduled by the single DCI and a starting PRB and an RB offset between two frequency hops that are provided by the single DCI.

In some embodiments, the UE may define a first type of physical downlink shared channel/physical uplink shared channel (PDSCH/PUSCH) for multi-PDSCH/multi-PUSCH scheduling and define a second type of PDSCH/PUSCH for multi-PDSCH/multi-PUSCH scheduling. Additionally, the UE may receive/transmit only the second type of PDSCH/PUSCH. In some embodiments, the UE may increment a hybrid automatic repeat request (HARQ) process number only over the second type of PDSCH/PUSCH. In some embodiments, the UE may increment a hybrid automatic repeat request (HARQ) process number over the first type of PDSCH/PUSCH and the second type of PDSCH/PUSCH and generate HARQ acknowledgement (ACK) bits for the first type of PDSCH/PUSCH and the second type of PDSCH/PUSCH. Note that the HARQ-ACK bits corresponding to the first type of PDSCH/PUSCH may be set to not ACK (NACK). In some embodiments, the first type of PDSCH may include PDSCHs of the multi-PDSCHs that are scheduled by a downlink control indicator (DCI) to collide with uplink symbols as indicated by a time, division duplex (TDD) configuration. The second type of PDSCH may include PDSCHs of the multi-PDSCHs that are scheduled by the DCI and do not collide with uplink symbols as indicated by the TDD configuration. In some embodiments, the first type of PUCCH may include PUSCHs of the multi-PUSCHs that are scheduled by a downlink control indicator (DCI) to collide with downlink symbols as indicated by a time division duplex (TDD) configuration. The second type of PUSCH may include PUSCHs of the multi-PUSCHs that are scheduled by the DCI and do not collide with downlink symbols as indicated by the TDD configuration.

In some embodiments, the UE may receive, from the serving cell, a downlink control indicator (DCI) that schedules multiple PDSCHs/PUSCHs and determine a gap between consecutively scheduled PDSCHs/PUSCHs based on at least one K0/K2 value. The at least one K0/K2 value may be a K0/K2 value for a first PDSCH/PUSCH and determining the gap between consecutively scheduled PDSCHs/PUSCHs may be further based on an additional gap offset value between PDSCHs/PUSCHs per start and length indicator value. In some embodiments, the at least one K0/K2 value may include a K0/K2 value for each PDSCH/PUSCH per start and length indicator value.

In some embodiments, the UE may add to the first HARQ-ACK sub-codebook, HARQ-ACK bits for physical downlink shared channels (PDSCHs) that are scheduled by a fallback DCI format 1_0. Additionally, the UE may add to the second HARQ-ACK sub-codebook, HARQ-ACK bits for PDSCHs that are scheduled by non-fallback DCI with an extended counter downlink assignment index (C-DAI) field and an extended total DAI (T-DAI) field. The extended C-DAI field may have a size greater than two bits. Additionally, the extended T-DAI field may have a size greater than two bits. In some embodiments, the first HARQ-ACK sub-codebook and second HARQ-ACK sub-codebook may be concatenated to generate a concatenated HARQ-ACK codebook. The UE may then transmit, over one Physical uplink shared channel (PUSCH) resource, the concatenated HARQ-ACK codebook. In some embodiments, the UE may transmit, over a first physical uplink shared channel (PUSCH) resource, the first HARQ-ACK sub-codebook. Additionally, the UE may transmit, over a second PUSCH resource, the second HARQ-ACK sub-codebook.

In some embodiments, the UE may receive, from the serving cell, an indication of a threshold value, e.g., a maximum number of physical downlink shared channels (PDSCHs) in a multi-PDSCH schedule that can be scheduled by a downlink control indicator (DCI). The indication may be received via a system information block (SIB) 1 message. Alternatively, the indication may be received via a medium access control (MAC) control element (CE), by selecting a threshold value from a set of threshold values configured via radio resource control (RRC) signaling. Further, the indication is received via the DCI, e.g., by selecting a threshold value from a set of threshold values configured via radio resource control (RRC) signaling. Additionally, the indication may be received via a group-specific DCI. In such instances, the UE may receive an index (e.g., a DCI field index) via radio resource control (RRC) signaling to locate a position of the indication within the group-specific DCI. Additionally, the UE may divide configured component carriers (CCs) into a first group and a second group based on the threshold value and a maximum number of addressable PDSCHs by the DCI for each CC. In some embodiments, dividing configured CCs into the first group and the second group based on the threshold value and the maximum number of addressable PDSCHs by the DCI for each CC may include the UE, to the first group, each CC that has a maximum number of addressable PDSCHs by the DCI that is less than or equal to the maximum number of PDSCHs in a multi-PDSCH schedule that can be scheduled by the DCI and the UE adding, to the second group, each CC that has a maximum number of addressable PDSCHs by the DCI that is greater than the maximum number of PDSCHs in multi-PDSCH schedule that can be scheduled by the DCI. Further, the UE may determine a first hybrid automatic repeat request (HARQ) acknowledgement (ACK) sub-codebook and a second HARQ-ACK sub-codebook based on one or more criteria, e.g., based, at least in part, on dividing the configured CCs into the first group and the second group. In some embodiments, determining the first HARQ-ACK sub-codebook and the second HARQ-ACK sub-codebook based on one or more criteria may include the UE adding, to the first HARQ-ACK sub-codebook, HARQ-ACK bits for PDSCHs scheduled on CCs in the first group, HARQ-ACK bits for a number of PDSCHs scheduled on CCs in the second group that is less than or equal to the threshold value, HARQ-ACK bits for PDSCHs scheduled by a tailback DCI regardless of whether the PDSCH is transmitted on a CC in the first group or on a CC in the second group, and HARQ-ACK bits for a physical downlink control channel (PDCCH) used for semi-persistent scheduling PDSCH release or secondary cell dormancy indication and the HE adding, to the second HARQ-ACK sub-codebook, any remaining HARQ-ACK bits not added to the first HARQ-ACK sub-codebook. In some embodiments, the UP may sequentially concatenate the first HARQ-ACK sub-codebook and the second HARQ-ACK sub-codebook. The concatenation may include placing the first HARQ-ACK sub-codebook before the second HARQ-ACK sub-codebook.

In some embodiments, the UP may increment a counter downlink assignment index (C-DAI) and a total DAI (T-DAI) for each valid [CC, physical downlink control channel (PDCCH) monitoring occasion] pair in which PDSCH reception or PDCCH that is included in the first HARQ-ACK sub-codebook.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any, combination of the method embodiments described herein, or, any subset of any of the method embodiments described herein, or, any combination of such subsets.

In some embodiments, a device (e.g., a UE 106) may be configured to include a processor (or a set of processor) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
   at least one antenna;
   at least one radio, wherein the at least one radio is configured to perform cellular communication using at least one radio access technology (RAT);
   one or more processors coupled to the at least one radio, wherein the one or more processors and the at least one radio are configured to perform communications;
   wherein the one or more processors are configured to cause the UE to:
     receive, from a serving cell, an indication of a threshold value, wherein the threshold value is a maximum number of physical downlink shared channels (PDSCHs) in a multi-PDSCH schedule that can be scheduled by a downlink control indicator (DCI);
     divide configured component carriers (CCs) into a first group and a second group based on the threshold value and a maximum number of addressable PDSCHs by a DCI for each CC; and
     determine a first hybrid automatic repeat request (HARQ) acknowledgement (ACK) sub-codebook and a second HARQ-ACK sub-codebook based on one or more criteria based, at least in part, on dividing the configured CCs into the first group and the second group.

2. The UE of claim 1,
   wherein the one or more processors are further configured to cause the UE to:
     sequentially concatenate the first HARQ-ACK sub-codebook and the second HARQ-ACK sub-codebook.

3. The UE of claim 1,
   wherein the indication of the threshold value is received via at least one of:
     a system information block (SIB) 1 message;
     a medium access control (MAC) control element (CE);
     the DCI; or
     a group-specific DCI, wherein the UE receives an DCI field index via radio resource control (RRC) signaling to locate a position of the indication within the group-specific DCI.

4. The UE of claim 1,
   wherein, to divide configured CCs into the first group and the second group based on the threshold value and the maximum number of addressable PDSCHs by the DCI for each CC, the one or more processors are further configured to cause the UE to:
     add, to the first group, each CC that has a maximum number of addressable PDSCHs by the DCI that is less than or equal to the threshold value; and
     add, to the second group, each CC that has a maximum number of addressable PDSCHs by the DCI that is greater than the threshold value.

5. The UE of claim 1,
   wherein, to determine the first HARQ-ACK sub-codebook and the second HARQ-ACK sub-codebook based on one or more criteria, the one or more processors are further configured to cause the UE to:
     add, to the first HARQ-ACK sub-codebook, HARQ-ACK bits for PDSCHs scheduled on CCs in the first group, HARQ-ACK bits for a number of PDSCHs scheduled on CC in the second group that is less than or equal to the threshold value, HARQ-ACK bits for PDSCHs scheduled by a fallback DCI regardless of whether the PDSCH is transmitted on a CC in the first group or on a CC in the second group, and HARQ-ACK bits for a physical downlink control channel (PDCCH) used for semi-persistent scheduling PDSCH release or secondary cell dormancy indication; and
   add, to the second HARQ-ACK sub-codebook, any remaining HARQ-ACK bits not added to the first HARQ-ACK sub-codebook.

6. The UE of claim 1,
   wherein the one or more processors are further configured to cause the UE to:
     define a first type of physical downlink control channel/physical downlink shared channel (PDSCH/PUSCH) for multi-PDSCH/multi-PUSCH scheduling;
     define a second type of PDSCH/PUSCH for multi-PDSCH/multi-PUSCH scheduling;
     receive/transmit only the second type of PDSCH/PUSCH; and
     increment a hybrid automatic repeat request (HARQ) process number only over the second type of PDSCH/PUSCH or increment the HARQ process number over the first type of PDSCH/PUSCH and the second type of PDSCH/PUSCH, wherein, when the HARQ process number is incremented over the first type of PDSCH/PUSCH and the second type of PDSCH/PUSCH, the one or more processors are further configured to cause the UE to generate HARQ acknowledgement (ACK) bits for the first type of PDSCH and the second type of PDSCH, wherein HARQ-ACK bits corresponding to the first type of PDSCH are set to not ACK (NACK); and wherein at least one of:
the first type of PDSCH includes PDSCHs of the multi-PDSCHs that are scheduled by a downlink control indicator (DCI) to collide with uplink symbols as indicated by a time division duplex (TDD) configuration and the second type of PDSCH includes PDSCHs of the multi-PDSCHs that are scheduled by the DCI and do not collide with uplink symbols as indicated by the TDD configuration; or the first type of PUSCH includes PUSCHs of the multi-PUSCHs that are scheduled by a DCI to collide with downlink symbols as indicated by a TDD configuration and wherein the second type of PUSCH includes PUSCHs of the multi-PUSCHs that are scheduled by the DCI and do not collide with downlink symbols as indicated by the TDD configuration.

7. The UE of claim 1,
wherein the one or more processors are further configured to cause the UE to:
receive, from the serving cell, a downlink control indicator (DCI) that schedules multiple PDSCHs/PUSCHs; and
determine a gap between consecutively scheduled PDSCHs/PUSCHs based on at least one K0/K2 value, wherein the at least one K0/K2 value includes at least one of:
a K0/K2 value for a first PDSCH/PUSCH, and wherein determining the gap between consecutively scheduled PDSCHs/PUSCHs is further based on an additional gap offset value between PDSCHs/PUSCHs per start and length indicator value; or
a K0/K2 value for each PDSCH/PUSCH per start and length indicator value.

8. The UE of claim 1,
wherein the one or more processors are further configured to cause the UE to:
index valid physical uplink control channel (PUSCH) transmission occasions within a multi-PUSCHs that are scheduled by a single DCI; and
determine a starting resource block (RB) of a PUSCH transmission occasion based on an index of the PUSCH within the multi-PUSCH that is scheduled by the single DCI and a starting PRB and an RB offset between two frequency hops that are provided by the single DCI.

9. A processor configured to cause a wireless device to:
receive, from a serving cell, an indication of a threshold value, wherein the threshold value is a maximum number of physical downlink shared channels (PDSCHs) in a multi-PDSCH schedule that can be scheduled by a downlink control indicator (DCI);

divide configured component carriers (CCs) into a first group and a second group based on the threshold value and a maximum number of addressable PDSCHs by a DCI for each CC; and
determine a first hybrid automatic repeat request (HARQ) acknowledgement (ACK) sub-codebook and a second HARQ-ACK sub-codebook based on one or more criteria based, at least in part, on dividing the configured CCs into the first group and the second group.

10. The processor of claim 9,
wherein the processor is further configured to cause the wireless device to:
sequentially concatenate the first HARQ-ACK sub-codebook and the second HARQ-ACK sub-codebook.

11. The processor of claim 9,
wherein the indication of the threshold value is received via at least one of:
a system information block (SIB) 1 message;
a medium access control (MAC) control element (CE);
the DCI; or
a group-specific DCI, wherein a DCI field index is received via radio resource control (RRC) signaling to locate a position of the indication within the group-specific DCI.

12. The processor of claim 9,
wherein, to divide configured CCs into the first group and the second group based on the threshold value and the maximum number of addressable PDSCHs by the DCI for each CC, the processor is further configured to cause the wireless device to:
add, to the first group, each CC that has a maximum number of addressable PDSCHs by the DCI that is less than or equal to the threshold value; and
add, to the second group, each CC that has a maximum number of addressable PDSCHs by the DCI that is greater than the threshold value.

13. The processor of claim 9,
wherein, to determine the first HARQ-ACK sub-codebook and the second HARQ-ACK sub-codebook based on one or more criteria, the processor is further configured to cause the wireless device to:
add, to the first HARQ-ACK sub-codebook, HARQ-ACK bits for PDSCHs scheduled on CCs in the first group, HARQ-ACK bits for a number of PDSCHs scheduled on CCs in the second group that is less than or equal to the threshold value, HARQ-ACK bits for PDSCHs scheduled by a fallback DCI regardless of whether the PDSCH is transmitted on a CC in the first group or on a CC in the second group, and HARQ-ACK bits for a physical downlink control channel (PDCCH) used for semi-persistent scheduling PDSCH release or secondary cell dormancy indication; and
add, to the second HARQ-ACK sub-codebook, any remaining HARQ-ACK bits not added to the first HARQ-ACK sub-codebook.

14. The processor of claim 9,
wherein the processor is further configured to cause the wireless device to:
define a first type of physical downlink control channel/physical downlink shared channel (PDSCH/PUSCH) for multi-PDSCH/multi-PUSCH scheduling;
define a second type of PDSCH/PUSCH for multi-PDSCH/multi-PUSCH scheduling;

receive/transmit only the second type of PDSCH/PUSCH; and increment a hybrid automatic repeat request (HARQ) process number only over the second type of PDSCH/PUSCH or increment the HARQ process number over the first type of PDSCH/PUSCH and the second type of PDSCH/PUSCH, wherein, when the HARQ process number is incremented over the first type of PDSCH/PUSCH and the second type of PDSCH/PUSCH, the processor is further configured to cause the wireless device to generate HARQ acknowledgement (ACK) bits for the first type of PDSCH and the second type of PDSCH, wherein HARQ-ACK bits corresponding to the first type of PDSCH are set to not ACK (NACK).

15. A method, comprising:

receiving, from a serving cell, an indication of a threshold value, wherein the threshold value is a maximum number of physical downlink shared channels (PDSCHs) in a multi-PDSCH schedule that can be scheduled by a downlink control indicator (DCI);

dividing configured component carriers (CCs) into a first group and a second group based on the threshold value and a maximum number of addressable PDSCHs by a DCI for each CC; and determining a first hybrid automatic repeat request (HARQ) acknowledgement (ACK) sub-codebook and a second HARQ-ACK sub-codebook based on one or more criteria based, at least in part, on dividing the configured CCs into the first group and the second group.

16. The method of claim 15, further comprising:

receiving, from the serving cell, a downlink control indicator (DCI) that schedules multiple PDSCHs/PUSCHs; and determining a gap between consecutively scheduled PDSCHs/PUSCHs based on at least one K0/K2 value.

17. The method of claim 15, further comprising:

indexing valid physical uplink control channel (PUSCH) transmission occasions within a multi-PUSCHs that are scheduled by a single DCI; and determining a starting resource block (RB) of a PUSCH transmission occasion based on an index of the PUSCH within the multi-PUSCH that is scheduled by the single DCI and a starting PRB and an RB offset between two frequency hops that are provided by the single DCI.

18. The method of claim 15, further comprising:

sequentially concatenating the first HARQ-ACK sub-codebook and the second HARQ-ACK sub-codebook.

19. The method of claim 15, wherein the indication of the threshold value is received via at least one of:
 a system information block (SIB) 1 message;
 a medium access control (MAC) control element (CE);
 the DCI; or
 a group-specific DCI, wherein a DCI field index is received via radio resource control (RRC) signaling to locate a position of the indication within the group-specific DCI.

20. The method of claim 15, wherein, to divide configured CCs into the first group and the second group based on the threshold value and the maximum number of addressable PDSCHs by the DCI for each CC, the method further comprises:
 adding, to the first group, each CC that has a maximum number of addressable PDSCHs by the DCI that is less than or equal to the threshold value; and
 adding, to the second group, each CC that has a maximum number of addressable PDSCHs by the DCI that is greater than the threshold value.

* * * * *

UNITED STATES PATENT AND TRADEMARK OFFICE
CERTIFICATE OF CORRECTION

PATENT NO. : 12,021,791 B2
APPLICATION NO. : 17/439275
DATED : June 25, 2024
INVENTOR(S) : Hong He et al.

Page 1 of 1

It is certified that error appears in the above-identified patent and that said Letters Patent is hereby corrected as shown below:

In the Claims

Column 32, Line 43, delete "CC" and substitute --CCs--.

Signed and Sealed this
Twenty-ninth Day of April, 2025

Coke Morgan Stewart
*Acting Director of the United States Patent and Trademark Office*